United States Patent
Choi et al.

(10) Patent No.: US 9,398,122 B2
(45) Date of Patent: Jul. 19, 2016

(54) SEQUENCE MAPPING METHOD AND APPARATUS IN WIRELESS COMMUNICATION SYSTEM

(75) Inventors: Hyeyoung Choi, Gyeonggi-do (KR); Hyunwoo Lee, Gyeonggi-do (KR); Hyukmin Son, Gyeonggi-do (KR); Seunghee Han, Gyeonggi-do (KR); Jinmin Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 14/131,632

(22) PCT Filed: Jul. 25, 2012

(86) PCT No.: PCT/KR2012/005927
§ 371 (c)(1),
(2), (4) Date: Jan. 8, 2014

(87) PCT Pub. No.: WO2013/015607
PCT Pub. Date: Jan. 31, 2013

(65) Prior Publication Data
US 2014/0126517 A1 May 8, 2014

Related U.S. Application Data

(60) Provisional application No. 61/511,991, filed on Jul. 27, 2011, provisional application No. 61/525,201, filed on Aug. 19, 2011, provisional application No. 61/532,108, filed on Sep. 8, 2011, provisional application No. 61/551,451, filed on Oct. 26, 2011.

(51) Int. Cl.
*H04W 4/00* (2009.01)
*H04L 29/08* (2006.01)
(Continued)

(52) U.S. Cl.
CPC *H04L 69/30* (2013.01); *H04L 1/06* (2013.01); *H04L 1/1822* (2013.01); *H04L 1/1854* (2013.01); *H04L 1/1861* (2013.01);
(Continued)

(58) Field of Classification Search
USPC .......................... 370/329, 330, 331, 333, 338
See application file for complete search history.

(56) References Cited

U.S. PATENT DOCUMENTS

2009/0274037 A1  11/2009  Lee et al.
2011/0007673 A1   1/2011  Ahn et al.
(Continued)

FOREIGN PATENT DOCUMENTS

WO      2011074868 A2    6/2011

OTHER PUBLICATIONS

3GPP TS 36.211 V10.2.0, '3GPP; TSGRAN; Evolved Universal Terrestrial Radio Access (E-UTRA) ; Physical channels and modulation (Release 10)', Jun. 2011 See sections 6.3-6.3.2, 6.9-6.9.3, 7.1-7.1.2; tables 7.1.1-1, 7.1.2-1; table 6.9.3-1; and fig. 6.3-1.
(Continued)

*Primary Examiner* — Zewdu A Beyen
(74) *Attorney, Agent, or Firm* — Dentons US LLP

(57) ABSTRACT

A method for mapping a sequence in a wireless communication system includes determining one or more resource blocks to which the sequence will be mapped, and mapping a plurality of modulation symbols to a plurality of resource elements included in the resource blocks, wherein the resource elements are positioned in regions other than OFDM symbol regions indicated by a physical control format indicator channel (PCHICH).

17 Claims, 24 Drawing Sheets

(51) Int. Cl.
  *H04L 5/00* (2006.01)
  *H04L 1/06* (2006.01)
  *H04L 1/00* (2006.01)
  *H04L 1/18* (2006.01)

(52) U.S. Cl.
  CPC ............ *H04L 5/001* (2013.01); *H04L 5/0016* (2013.01); *H04L 5/0023* (2013.01); *H04L 5/0037* (2013.01); *H04L 5/0044* (2013.01); *H04L 5/0046* (2013.01); *H04L 5/0048* (2013.01); *H04L 5/0053* (2013.01); *H04L 5/0055* (2013.01); *H04L 5/0073* (2013.01); *H04L 1/0026* (2013.01); *H04L 1/0088* (2013.01); *H04L 1/1819* (2013.01)

(56) References Cited

U.S. PATENT DOCUMENTS

2011/0263286 A1* 10/2011 Damnjanovic ...... H04W 74/008
  455/513
2012/0002750 A1* 1/2012 Hooli ................... H04B 7/0417
  375/295

OTHER PUBLICATIONS

ZTE, 'Aspects on DL control signalling enhancements', R1-111521, 3GPP TSG-RAN WG1 #65, Barcelona, Spain, May 9-13, 2011 See sections 3, 4; and figs. 1-4.

* cited by examiner

Fig. 6
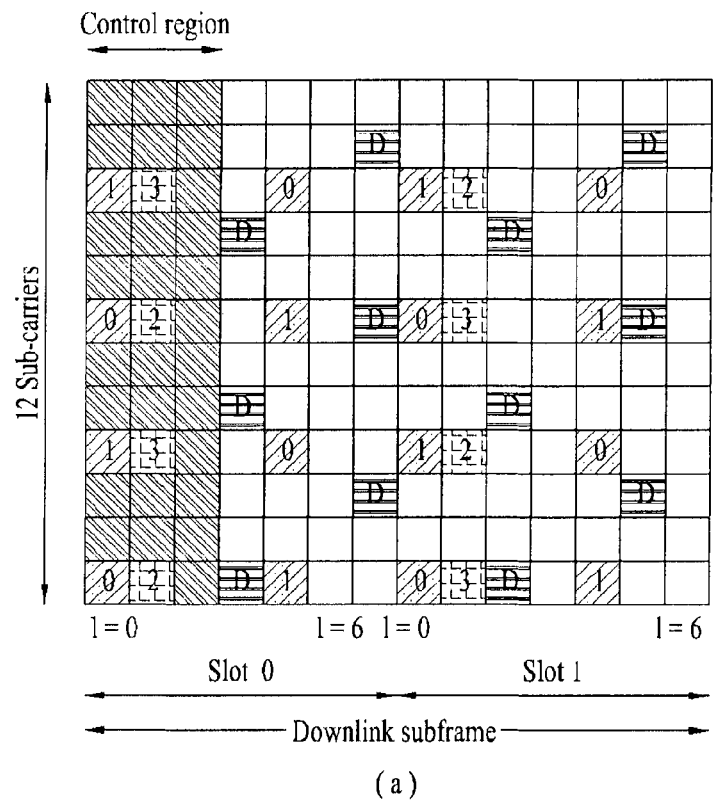
(a)
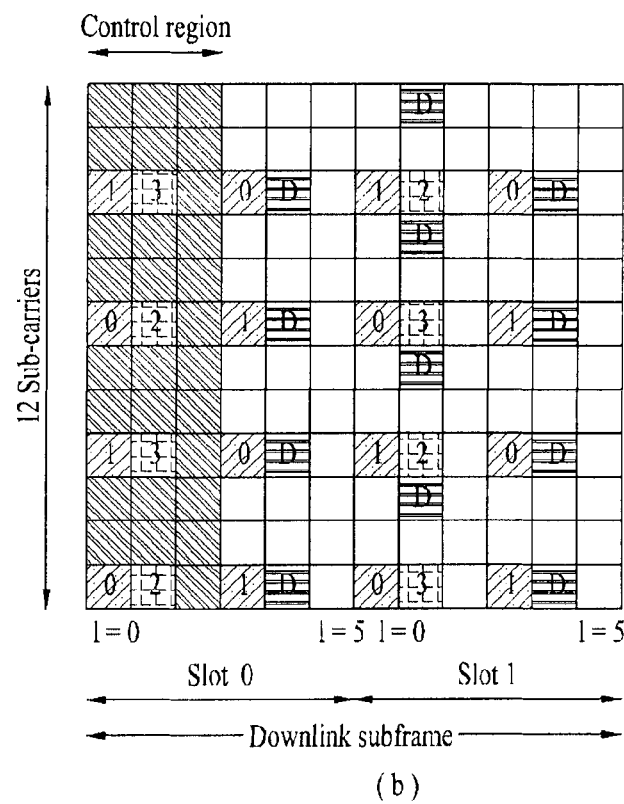
(b)

MeNB : macro eNodeB  
PeNB : pico eNodeB  
FeNB : femto eNodeB

MUE : macro UE  
PUE : pico UE  
FUE : femto eNodeB

Fig. 12
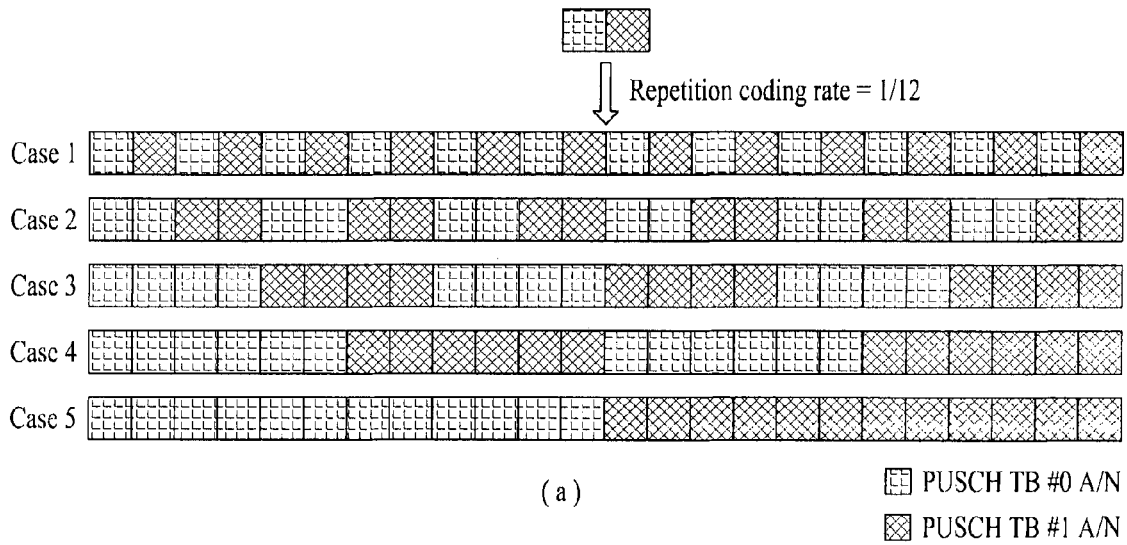
(a)
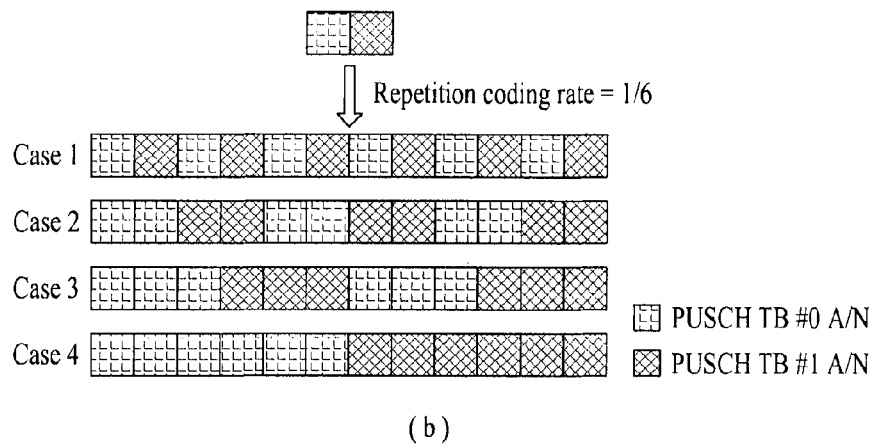
(b)
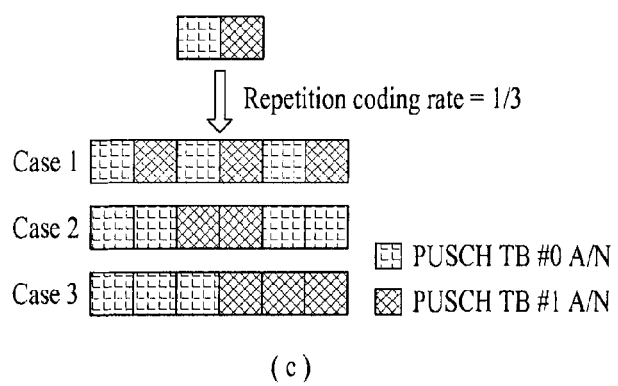
(c)

Fig. 13
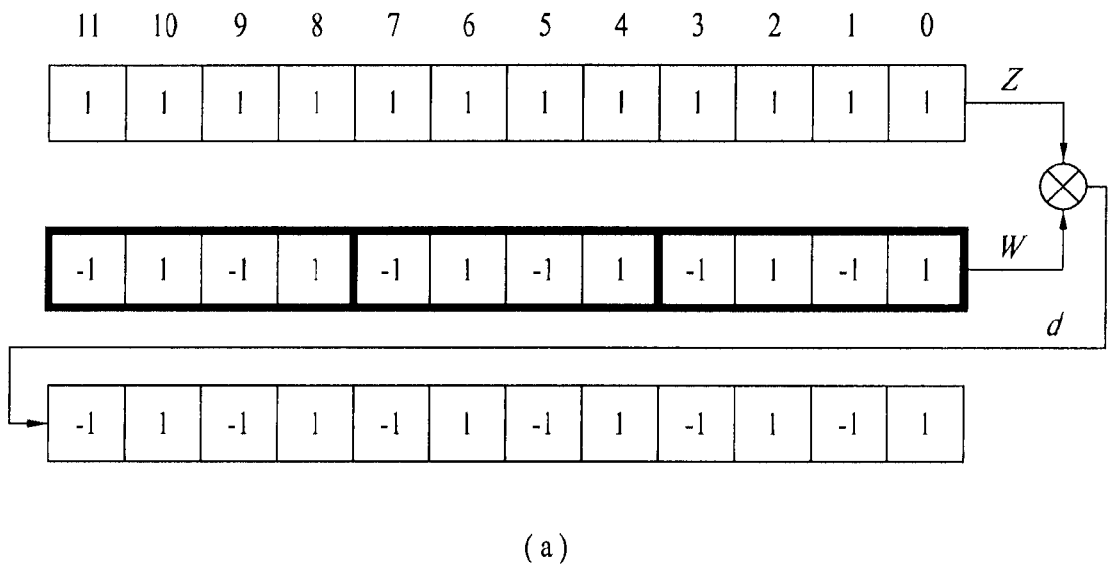
(a)
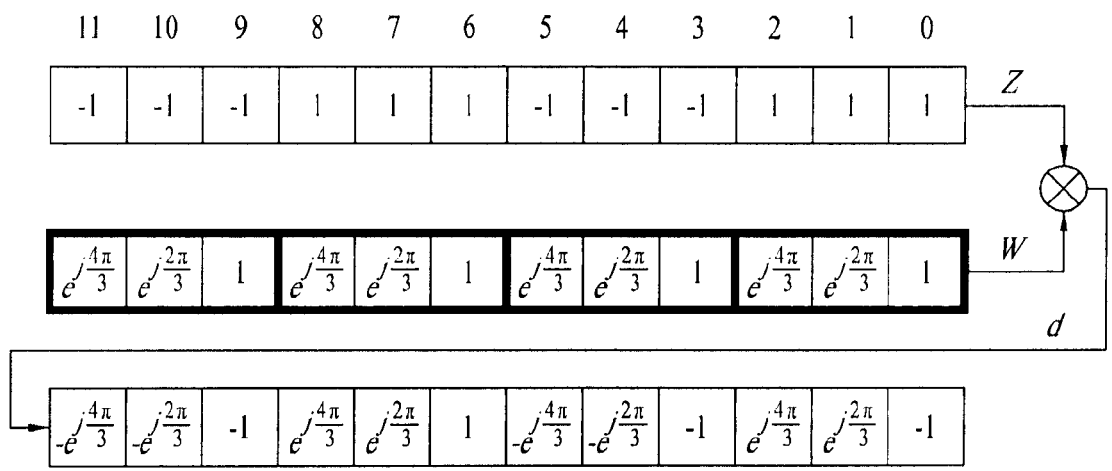
(b)

Fig. 14
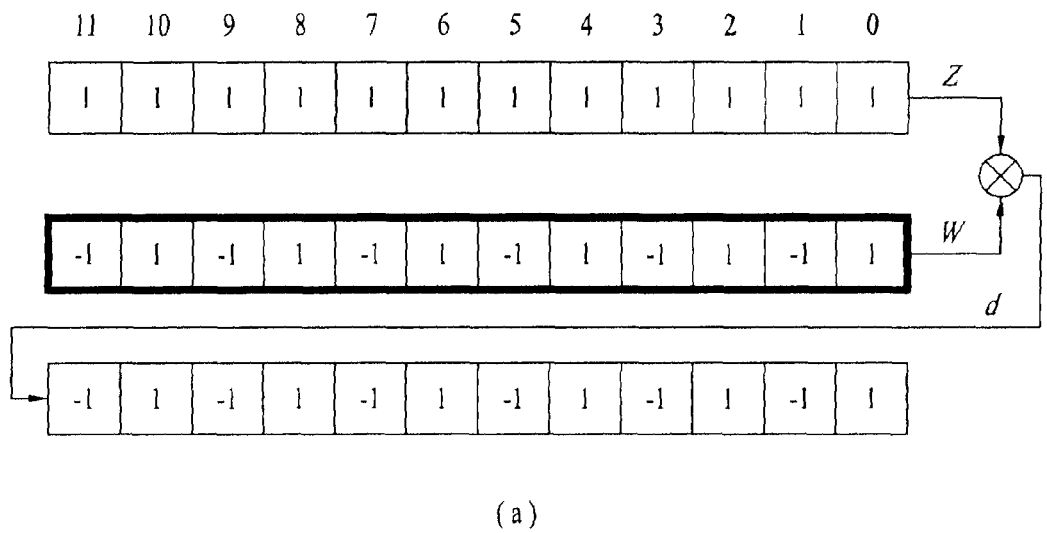
(a)
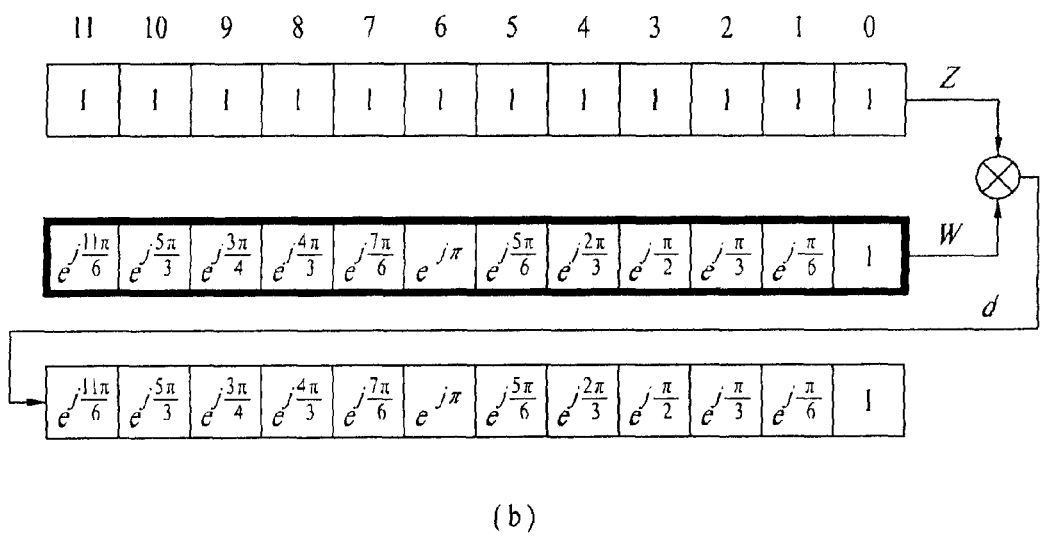
(b)

Fig. 19
(a) 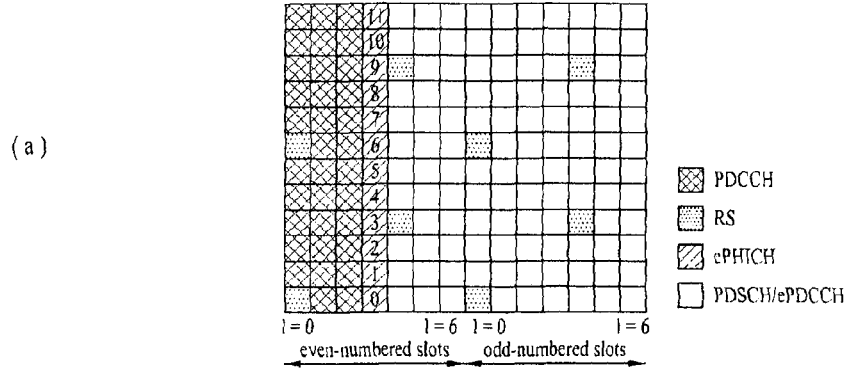
(b) 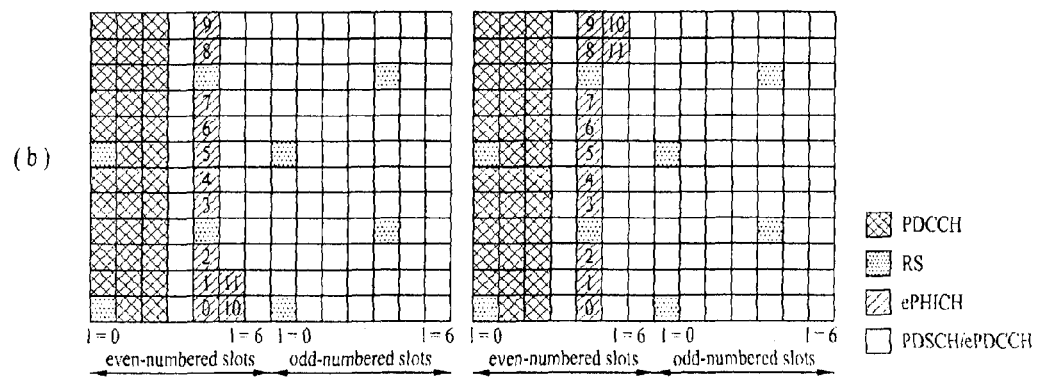
(c) 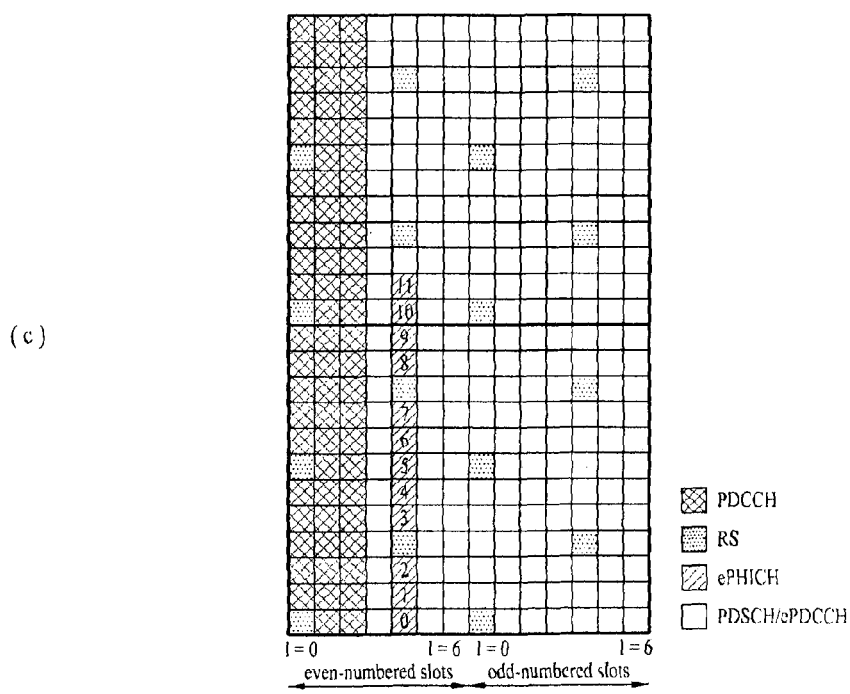

SEQUENCE MAPPING METHOD AND APPARATUS IN WIRELESS COMMUNICATION SYSTEM

This application is a 35 USC §371 National Stage entry of International Application No. PCT/KR2012/005927, filed on Jul. 25, 2012, which claims priority to U.S. Provisional Application No. 61/511,991, filed on Jul. 27, 2011, U.S. Provisional Application No. 61/525,201, filed on Aug. 19, 2011, U.S. Provisional Application No. 61/532,108, filed on Sep. 8, 2011, and U.S. Provisional Application No. 61/551,451, filed on Oct. 26, 2011, each of which are hereby incorporated by reference in its entirety.

TECHNICAL FIELD

The present invention relates to a sequence mapping method and apparatus in a wireless communication system.

BACKGROUND ART

Extensive research has been conducted to provide various types of communication services including voice and data services in wireless communication systems. In general, a wireless communication system is a multiple access system that supports communication with multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

DISCLOSURE

Technical Problem

An object of the present invention is to provide a method and apparatus for mapping sequences, generated from reception acknowledgement for one or more transport blocks, to resource elements.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

In accordance with a first aspect of the present invention, a method for mapping a sequence in a wireless communication system includes determining one or more resource blocks to which the sequence will be mapped, and mapping a plurality of modulation symbols to a plurality of resource elements included in the resource blocks, wherein the resource elements are positioned in regions other than OFDM symbol regions indicated by a physical control format indicator channel (PCHICH).

In accordance with a second aspect of the present invention, an eNB in a wireless communication system includes a transmission module and a processor, wherein the processor is configured to determine one or more resource blocks to which a sequence will be mapped and to map a plurality of modulation symbols to a plurality of resource elements included in the resource blocks, wherein the resource elements are positioned in regions other than OFDM symbol regions indicated by a PCFICH.

The first and second aspects of the present invention may include all or some of the following.

The resource blocks may be allocated to a UE that receives the sequence.

The resource blocks may include a resource block that is not allocated to the UE receiving the sequence.

The resource blocks may correspond to all resource blocks included in a corresponding frequency band.

A start index of the resource elements to which the plurality of modulation symbols are mapped may be determined depending on a cell identifier.

The mapping of the plurality of modulation symbols may comprise sequentially mapping the plurality of modulation symbols to the plurality of resource elements in the frequency domain or in the time domain.

The mapping of the plurality of modulation symbols may comprise grouping the plurality of modulation symbols into a plurality of groups each including n modulation symbols, and mapping the plurality of groups to the plurality of resource elements in the frequency domain or in the time domain.

Each of the plurality of groups may be mapped with n resource elements interval in the plurality of resource elements.

The mapping of the plurality of modulation symbols may comprise mapping the modulation symbols to resource elements adjacent to resource elements mapped to reference signals in the resource blocks.

When the resource blocks are not allocated to the UE receiving the sequence, information about at least one of an OFDM symbol or a subcarrier in which mapping of the resource elements is started may be transmitted to the UE.

The plurality of modulation symbols may be generated from reception acknowledgement for one or more transport blocks.

The one or more transport blocks may be mapped to two or more layers and transmitted on a physical uplink shared channel.

Advantageous Effects

According to embodiments of the present invention, it is possible to efficiently map an ACK/NACK signal generated when an ePHICH is introduced to a time-frequency resource.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 6 is a diagram illustrating a downlink reference signal;

FIGS. 12 to 15 are diagrams illustrating schemes for generating a sequence of modulation symbols for coherent detection according to embodiments of the present invention;

FIGS. 19 and 20 are diagrams illustrating frequency-domain-first mapping methods according to embodiments of the present invention;

BEST MODE

Figure 1:
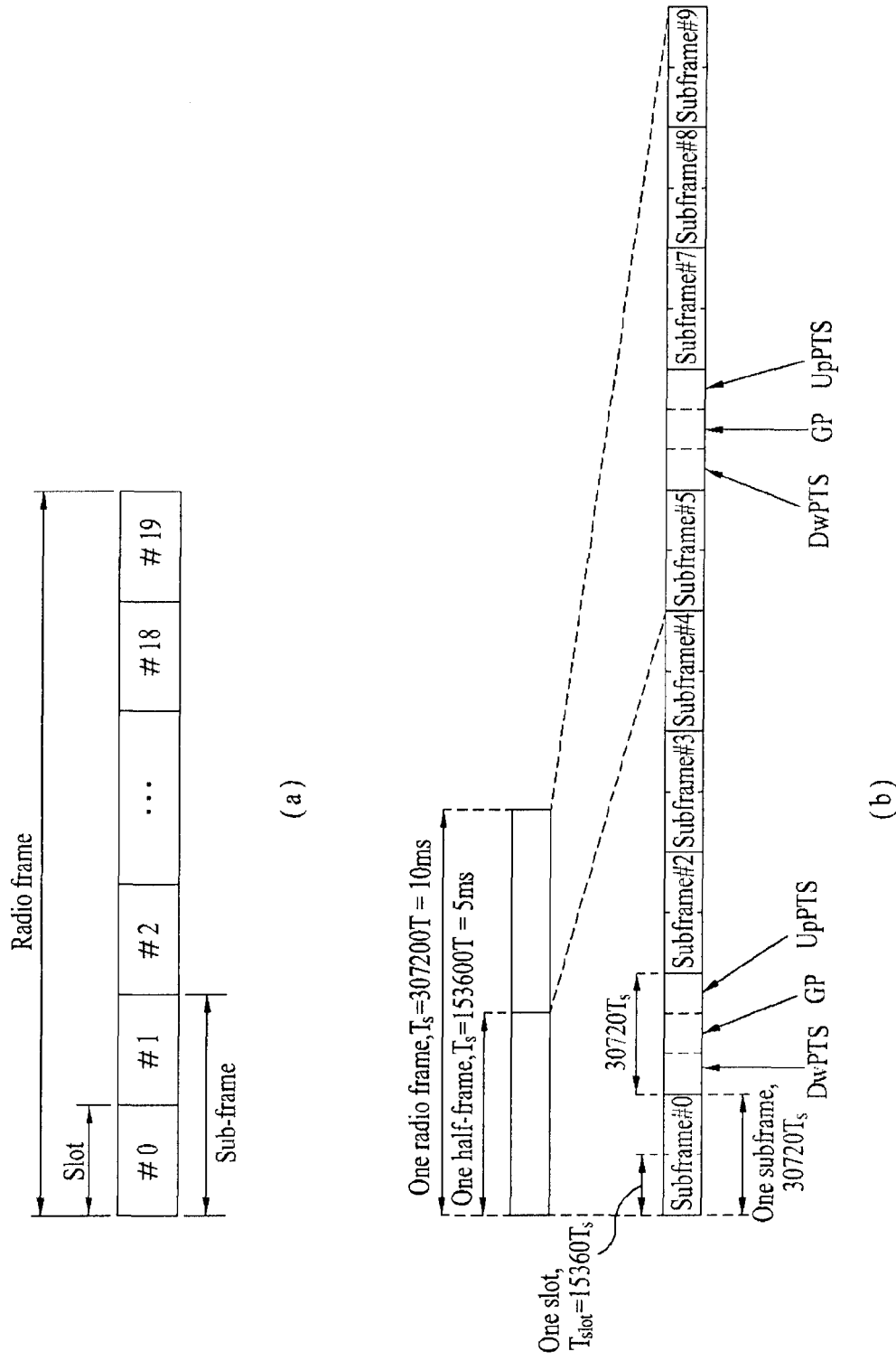
FIG. 1 illustrates a radio frame structure.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

FIG. 1 illustrates a radio frame structure used in a 3GPP LTE system. Referring to FIG. 1(*a*), one radio frame may be divided into 10 subframes, each subframe including two slots in the time domain. The transmission time of one subframe is defined as a Transmission Time Interval (TTI). For example, one subframe may be 1 ms long and one slot may be 0.5 ms long. One slot may include a plurality of orthogonal frequency division multiplexing (OFDM) symbols in the time domain. Because the 3GPP LTE system uses orthogonal frequency division multiple access (OFDMA) for downlink, an OFDM symbol may represent one symbol period. An OFDM symbol may be regarded as a single carrier-frequency division multiple access (SC-FDMA) symbol or symbol period for uplink. A Resource Block (RB) is a resource allocation unit including a plurality of contiguous subcarriers in one slot. This radio frame structure is exemplary. Accordingly, the number of subframes included in a radio frame, the number of slots included in a subframe, and the number of OFDM symbols included in a slot may vary.

FIG. 1(*b*) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between downlink and uplink, for eliminating interference with the uplink caused by multi-path delay of a downlink signal.

The aforementioned radio frame structure is purely exemplary and thus the number of subframes included in a radio frame, the number of slots included in a subframe, or the number of symbols included in a slot may vary.

Figure 2:
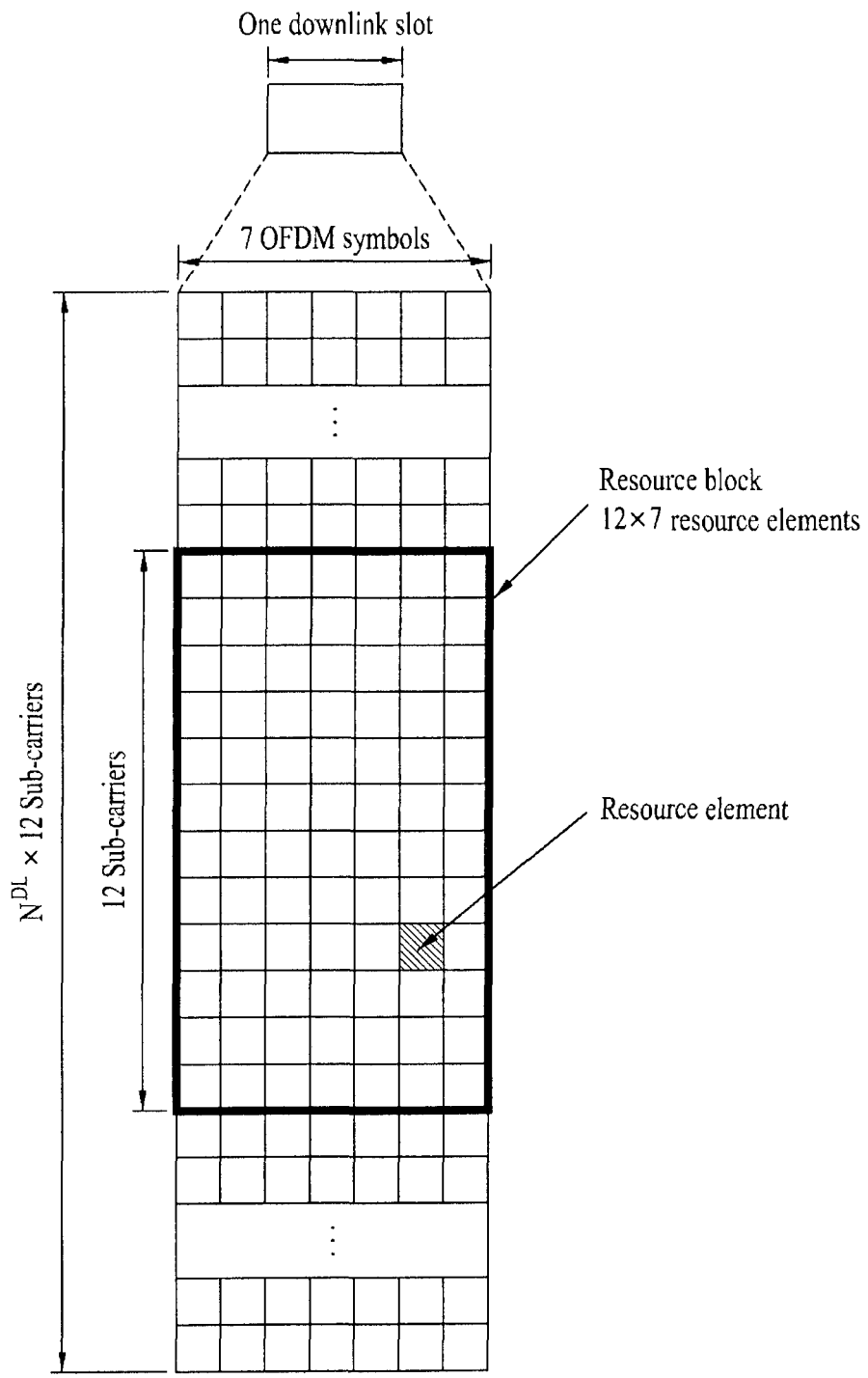
FIG. 2 illustrates a resource grid in a downlink slot.

FIG. 2 illustrates a resource grid in a downlink slot. While FIG. 2 shows that a downlink slot includes 7 OFDM symbols in the time domain and each RB has 12 subcarriers in the frequency domain, the present invention is not limited thereto. For example, one slot can include 7 OFDM symbols in a normal cyclic prefix (CP) case whereas one slot can include 6 OFDM symbols in an extended CP case. Each element in the resource grid is referred to as a resource element (RE). An RB includes 12×7 REs. The number of RBs per downlink slot, $N^{DL}$ depends on downlink transmission bandwidth. An uplink slot structure may correspond to the downlink slot structure.

Figure 3:
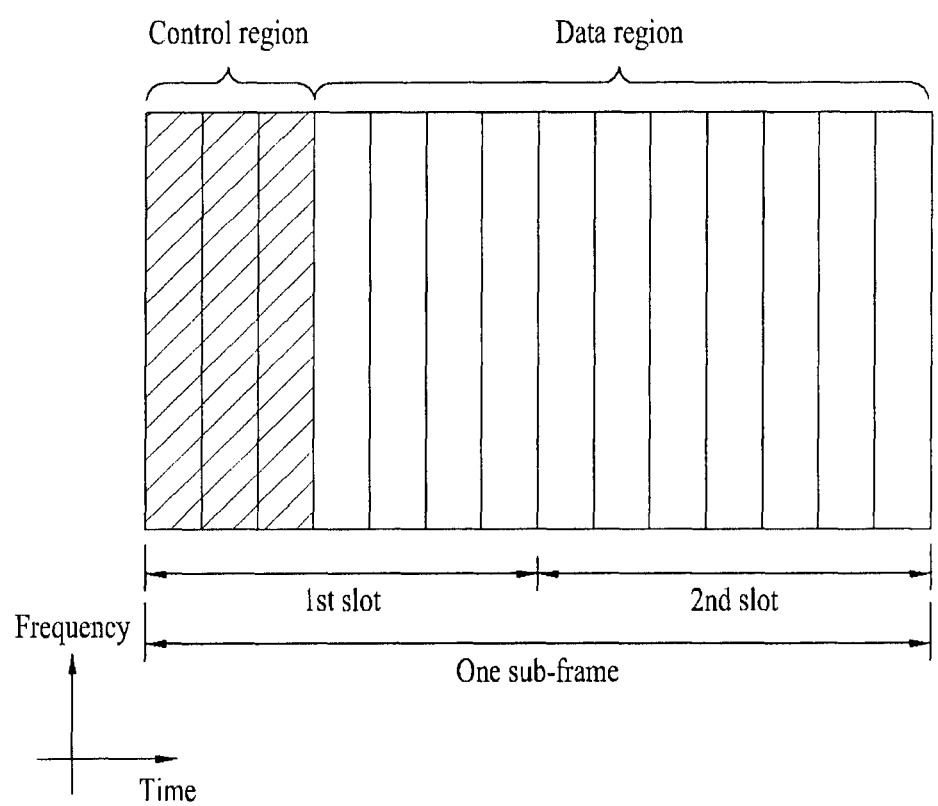
FIG. 3 illustrates a downlink subframe structure.

FIG. 3 illustrates a downlink subframe structure. Referring to FIG. 3, OFDM symbols at the start of a downlink subframe are used for a control region to which a control channel is allocated and the other OFDM symbols of the downlink subframe are used for a data region to which a physical downlink shared channel (PDSCH) is allocated. Downlink control channels used in an LTE system include a physical control format indicator channel (PCFICH), a physical downlink control channel (PDCCH), a physical hybrid automatic repeat request indicator channel (PHICH), etc.

The PCFICH is located in the first OFDM symbol of a subframe, carrying information about the number of OFDM symbols used for transmission of control channels in the subframe.

The PHICH delivers a HARQ acknowledgment/negative acknowledgment (ACK/NACK) signal in response to an uplink transmission.

The PDCCH transmits downlink control information (DCI). The DCI may include uplink or downlink scheduling information or an uplink transmit power control command for an arbitrary UE group according to format.

DCI Format

DCI formats 0, 1, 1A, 1B, 1C, 1D, 2, 2A, 2B, 2C, 3, 3A and 4 are defined in LTE-A (release 10). DCI formats 0, 1A, 3 and 3A have the same message size to reduce the number of blind decoding operations, which will be described later. The DCI formats may be divided into i) DCI formats 0 and 4 used for uplink scheduling grant, ii) DCI formats 1, 1A, 1B, 1C, 2A, 2B and 2C used for downlink scheduling allocation, and iii) DCI formats 3 and 3A for power control commands according to purpose of control information to be transmitted.

DCI format 0 used for uplink scheduling grant may include a carrier indicator necessary for carrier aggregation which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission with respect to an HARQ process, a transmit power control (TPC) command for a scheduled PUSCH, information on a cyclic shift for a demodulation reference signal (DMRS) and OCC index, and an uplink index and channel quality indicator request necessary for a TDD operation, etc. DCI format 0 does not include a redundancy version, differently from DCI formats relating to downlink scheduling allocation, because DCI format 0 uses synchronous HARQ. The carrier indicator is not included in DCI formats when cross-carrier scheduling is not used.

DCI format 4 is newly added to DCI formats in LTE-A release 10 and supports application of spatial multiplexing to uplink transmission in LTE-A. DCI format 4 has a larger message size because it further includes information for spatial multiplexing. DCI format 4 includes additional control information in addition to control information included in DCI format 0. DCI format 4 includes information on a modulation and coding scheme for the second transmission block, precoding information for multi-antenna transmission, and sounding reference signal (SRS) request information. DCI format 4 does not include the offset for format 0/format 1A differentiation because it has a size larger than DCI format 0.

DCI formats 1, 1A, 1B, 1C, 1D, 2, 2A, 2B and 2C for downlink scheduling allocation may be divided into DCI formats 1, 1A, 1B, 1C and 1D that do not support spatial multiplexing and DCI formats 2, 2A, 2B and 2C that support spatial multiplexing.

DCI format 1C supports only frequency contiguous allocation as compact frequency allocation and does not include the carrier indicator and redundancy version, compared to other formats.

DCI format 1A is for downlink scheduling and random access procedure. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission with respect to a HARQ process, a TPC command for a PUCCH, an uplink index necessary for a TDD operation, etc.

DCI format 1 includes control information similar to that of DCI format 1A. DCI format 1 supports non-contiguous resource allocation whereas DCI format 1A supports contiguous resource allocation. Accordingly, DCI format 1 further includes a resource allocation header, and thus slightly increases control signaling overhead as a trade-off for an increase in resource allocation flexibility.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C may be regarded as an extended version of DCI format 2B and supports spatial multiplexing for up to 8 layers.

DCI formats 3 and 3A may be used to complement the TPC information included in the aforementioned DCI formats for uplink scheduling grant and downlink scheduling allocation, that is, to support semi-persistent scheduling. A 1-bit command is used per UE in the case of DCI format 3 whereas a 2-bit command is used per UE in the case of DCI format 3A.

One of the above-mentioned DCI formats is transmitted through a PDCCH, and a plurality of PDCCHs may be transmitted in a control region. A UE can monitor the plurality of PDCCHs.

PDCCH Processing

When DCI is transmitted on a PDCCH, a cyclic redundancy check (CRC) is added to the DCI. The CRC is masked by a radio network temporary identifier (RNTI). Here, different RNTIs may be used according to transmission purpose of the DCI. Specifically, P-RNTI may be used for a paging message relating to network initiated connection establishment, RA-RNTI may be used in a case relating to random access, and SI-RNTI may be used in a case relating to a symbol information block (SIB). In the case of unicast transmission, C-RNTI, a unique UE identifier, may be used. The DCI with the CRC added thereto is coded into a predetermined code, and then adjusted to correspond to the quantity of resources used for transmission through rate-matching.

In PDCCH transmission, control channel elements (CCEs), contiguous logical allocation units, are used to map a PDCCH to REs for efficient processing. A CCE includes 36 REs corresponding to 9 resource element groups (REGs). The number of CCEs necessary for a specific PDCCH depends on a DCI payload corresponding to a control information size, a cell bandwidth, a channel coding rate, etc. Specifically, the number of CCEs for a specific PDCCH can be defined according to PDCCH format, as shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As shown in Table 1, the number of CCEs depends on the PDCCH format. For example, a transmitter can adaptively use PDCCH formats in such a manner that it uses PDCCH format 0 and changes PDCCH format 0 to PDCCH format 2 when a channel status becomes poor.

Blind Decoding

While one of the above-mentioned PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 2.

TABLE 2

| Search space | | The number of PDCCH candidates |
|---|---|---|
| Aggregation level | Size (CCE unit) | |
| UE-specific | | |
| 1 | 6 | 6 |
| 2 | 12 | 6 |
| 4 | 8 | 2 |
| 8 | 16 | 2 |
| Common | | |
| 4 | 16 | 4 |
| 8 | 16 | 2 |

As shown Table 2, the UE has a plurality of search spaces at each aggregation level because 4 aggregation levels are present.

The search spaces may be divided into a UE-specific search space and a common search space, as shown in Table 2. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

Figure 4:
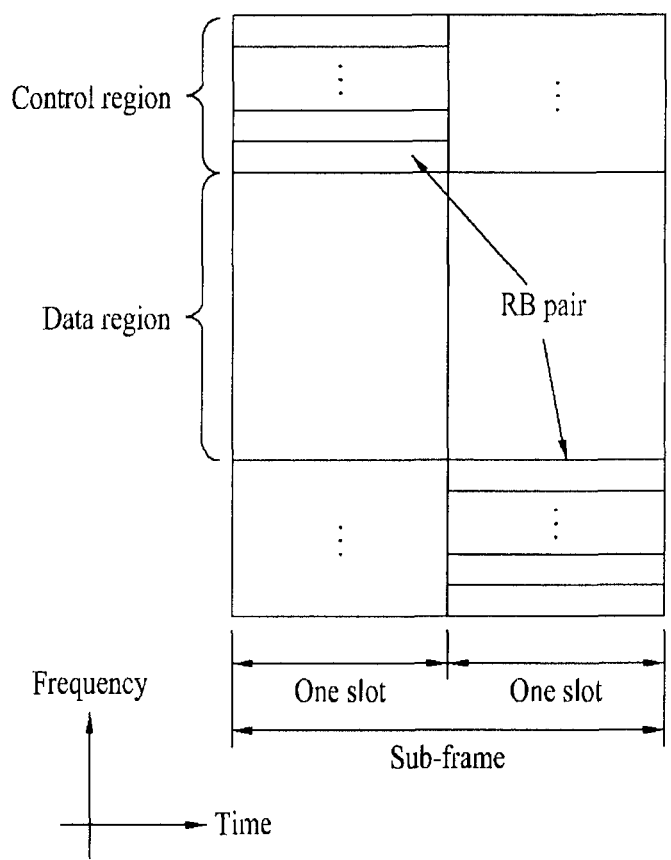
FIG. 4 illustrates an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain a single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Physical Uplink Control Channel (PUCCH)

Uplink control information (UCI) transmitted on a PUCCH may include a scheduling request (SR), HARQ ACK/NACK information, and downlink channel measurement information.

The HARQ ACK/NACK information may be generated according to whether a downlink data packet on a PDSCH is successfully decoded. In conventional wireless communication systems, 1 bit is transmitted as ACK/NACK information for downlink single codeword transmission and 2 bits are transmitted as the ACK/NACK information for 2-codeword downlink transmission.

The channel measurement information represents feedback information about a multiple input multiple output (MIMO) scheme and may include a channel quality indicator (CQI), a precoding matrix index (PMI), and a rank indicator (RI) which may be collectively referred to as a CQI. 20 bits per subframe may be used to transmit the CQI.

A PUCCH can be modulated using binary phase shift keying (BPSK) and quadrature phase shift keying (QPSK). Control information of a plurality of UEs can be transmitted through a PUCCH. When code division multiplexing (CDM) is performed in order to distinguish signals of the UEs from one another, a length-12 constant amplitude zero autocorrelation (CAZAC) sequence is used. The CAZAC sequence is suitable to increase coverage by reducing a peak-to-average power ratio (PAPR) of a UE or cubic metric (CM) because it maintains a specific amplitude in the time domain and the frequency domain. ACK/NACK information with respect to downlink data transmitted through a PUCCH is covered using an orthogonal sequence or an orthogonal cover (OC).

Control information signals transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may vary according to channel delay spread. Various types of sequences may be used as the base sequence and the aforementioned CAZAC sequence is an example of the various sequences.

The amount of control information that can be transmitted by a UE through a subframe can be determined according to the number of SC-FDMA symbols (i.e. SC-FDMA symbols other than SC-FDMA symbols used for reference signal (RS) transmission for detection of coherent of a PUCCH) which can be used for control information transmission.

PUCCH format 1 is used to transmit an SR only. When the SR is solely transmitted, an unmodulated waveform is applied, which will be described in detail below.

PUCCH format 1a or 1b is used for HARQ ACK/NACK transmission. When HARQ ACK/NACK alone is transmitted in a subframe, PUCCH format 1a or 1b may be used. Furthermore, HARQ ACK/NACK and SR may be transmitted in the same subframe using PUCCH format 1a or 1b.

PUCCH format 2 is used for CQI transmission whereas PUCCH format 2a or 2b is used for transmission of CQI and HARQ ACK/NACK. In the extended CP case, PUCCH format 2 may be used for transmission of CQI and HARQ ACK/NACK.

Figure 5:
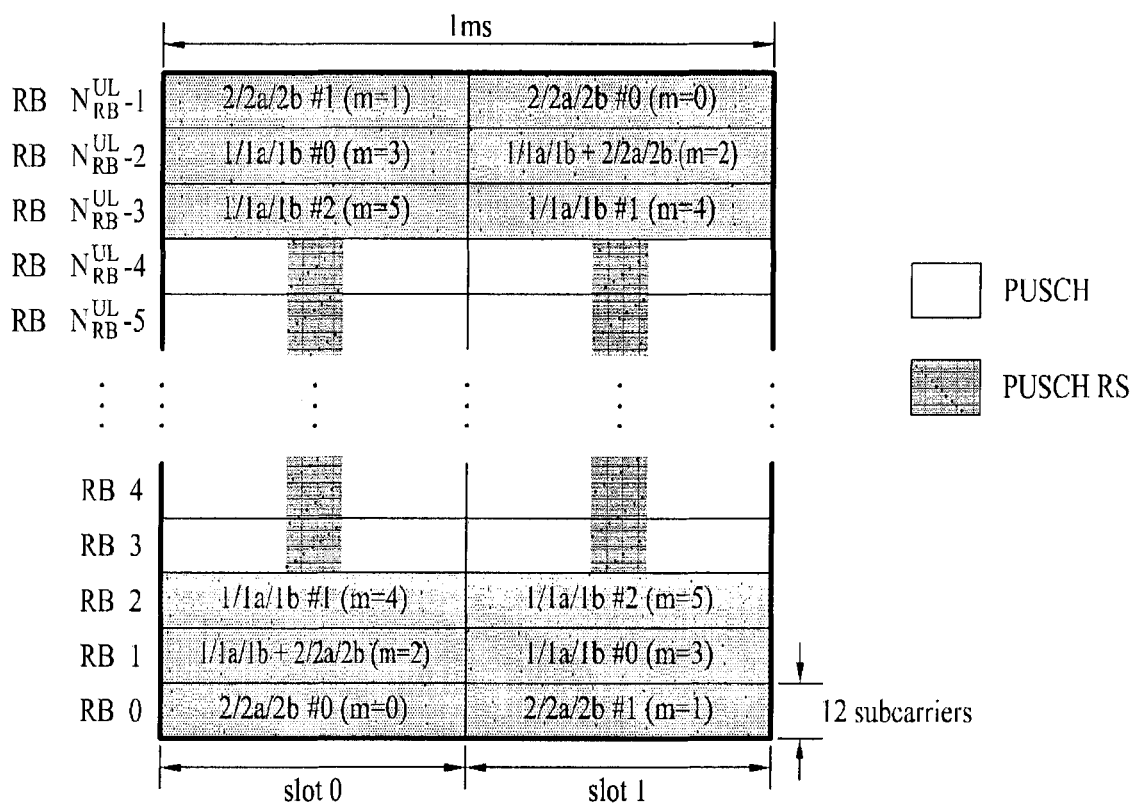
FIG. 5 illustrates mapping of PUCCH formats to uplink physical resource blocks.

FIG. 5 illustrates mapping of PUCCH formats to PUCCH regions in uplink physical resource blocks. In FIG. 5, $N_{RB}^{UL}$ denotes the number of resource blocks on uplink and $0, 1, \ldots, N_{RB}^{UL}-1$ denote physical resource block numbers. PUCCHs are mapped to both edges of uplink frequency blocks basically. PUCCH formats 2/2a/2b are mapped to PUCCH regions indicated by m=0,1, which represents that PUCCH formats 2/2a/2b are mapped to resource blocks located at band-edges. PUCCH formats 2/2a/2b and PUCCH formats 1/1a/1b may be mixed and mapped to PUCCH regions indicated by m=2. PUCCH formats 1/1a/1b may be mapped to PUCCH regions indicated by m=3, 4, 5. The number $N_{RB}^{(2)}$ of PUCCH RBs can be used by PUCCH formats 2/2a/2b may be signaled to UEs in a cell through broadcast signaling.

Reference Signal (RS)

In a wireless communication system, a packet is transmitted on a radio channel. In view of the nature of the radio channel, the packet may be distorted during transmission. To receive the signal successfully, a receiver should compensate for distortion in the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between transmit antennas and receive antennas is required for successful signal reception. Accordingly, an RS should exist separately for each transmit antenna.

Downlink RSs include a common reference signal (CRS) shared by all UEs in a cell and a dedicated RS (DRS) for a specific UE only. Information for channel estimation and demodulation may be provided using these RSs.

A receiver (UE) may estimate a channel state from a CRS and feed back an indicator relating to channel quality, such as a CQI, PMI and/or RI to a transmitter (eNB). The CRS may also be called a cell-specific RS. An RS relating to feedback of channel state information (CSI) such as CQI/PMI/RI may be separately defined as a CSI-RS.

The DRS may be transmitted through a corresponding RE when data on a PDSCH needs to be demodulated. A higher layer may signal presence or absence of the DRS to a UE. In addition, it is possible to signal that the DRS is valid only when a corresponding PDSCH is mapped to the UE. The DRS may also be referred to as a UE-specific RS or a demodulation RS (DMRS).

FIG. 6 illustrates patterns of mapping CRSs and DRSs defined in a 3GPP LTE system (e.g. release-8) to downlink RB pairs. A downlink RB pair as an RS mapping unit may be represented as (one subframe in the time domain)×(12 subcarriers in the frequency domain). That is, a RB pair has a length corresponding to 14 OFDM symbols in the time domain in the normal CP case (FIG. 6(a)) and has a length corresponding to 12 OFDM symbols in the extended CP case (FIG. 6(b)).

Sounding Reference Signal (SRS)

An SRS is used for an eNB to measure channel quality and perform uplink frequency-selective scheduling based on the channel quality measurement. The SRS is not associated with data and/or control information transmission. However, the usages of the SRS are not limited thereto. The SRS may also be used for enhanced power control or for supporting various start-up functions of non-scheduled UEs. The start-up functions may include, for example, an initial modulation and coding scheme (MCS), initial power control for data transmission, timing advance, and frequency non-selective scheduling (in which a transmitter selectively allocates a frequency resource to the first slot of a subframe and then pseudo-randomly hops to another frequency resource in the second slot of the subframe). The SRS may be used for measuring downlink channel quality on the assumption of the reciprocity of a radio channel between the downlink and the uplink. This assumption is valid especially in a time division duplex (TDD) system in which downlink and uplink share the same frequency band and are distinguished by time.

A subframe in which a UE within a cell is supposed to transmit an SRS is indicated by cell-specific broadcast signaling. A 4-bit cell-specific parameter 'srsSubframeConfiguration' indicates 15 possible configurations for subframes carrying SRSs in each radio frame. These configurations may provide flexibility with which SRS overhead can be adjusted according to network deployment scenarios. The other configuration (a $16^{th}$ configuration) represented by the parameter is for switch-off of SRS transmission in a cell, suitable for a cell serving high-speed UEs, for example.

An SRS is always transmitted in the last SC-FDMA symbol of a configured subframe. Therefore, an SRS and a DMRS are positioned in different SC-FDMA symbols. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated for a given time unit and frequency band, using a base sequence (a random sequence or Zadoff-Chu (ZC)-based sequence set), and all UEs within a cell use the same base sequence. SRS transmissions in the same time unit and the same frequency band from a plurality of UEs within a cell are distinguished orthogonally by different cyclic shifts of the base sequence allocated to the plurality of UEs. Although the SRS sequences of different cells may be distinguished by allocating different base sequences to the cells, orthogonality is not ensured between the different base sequences.

Carrier Aggregation

Figure 7:
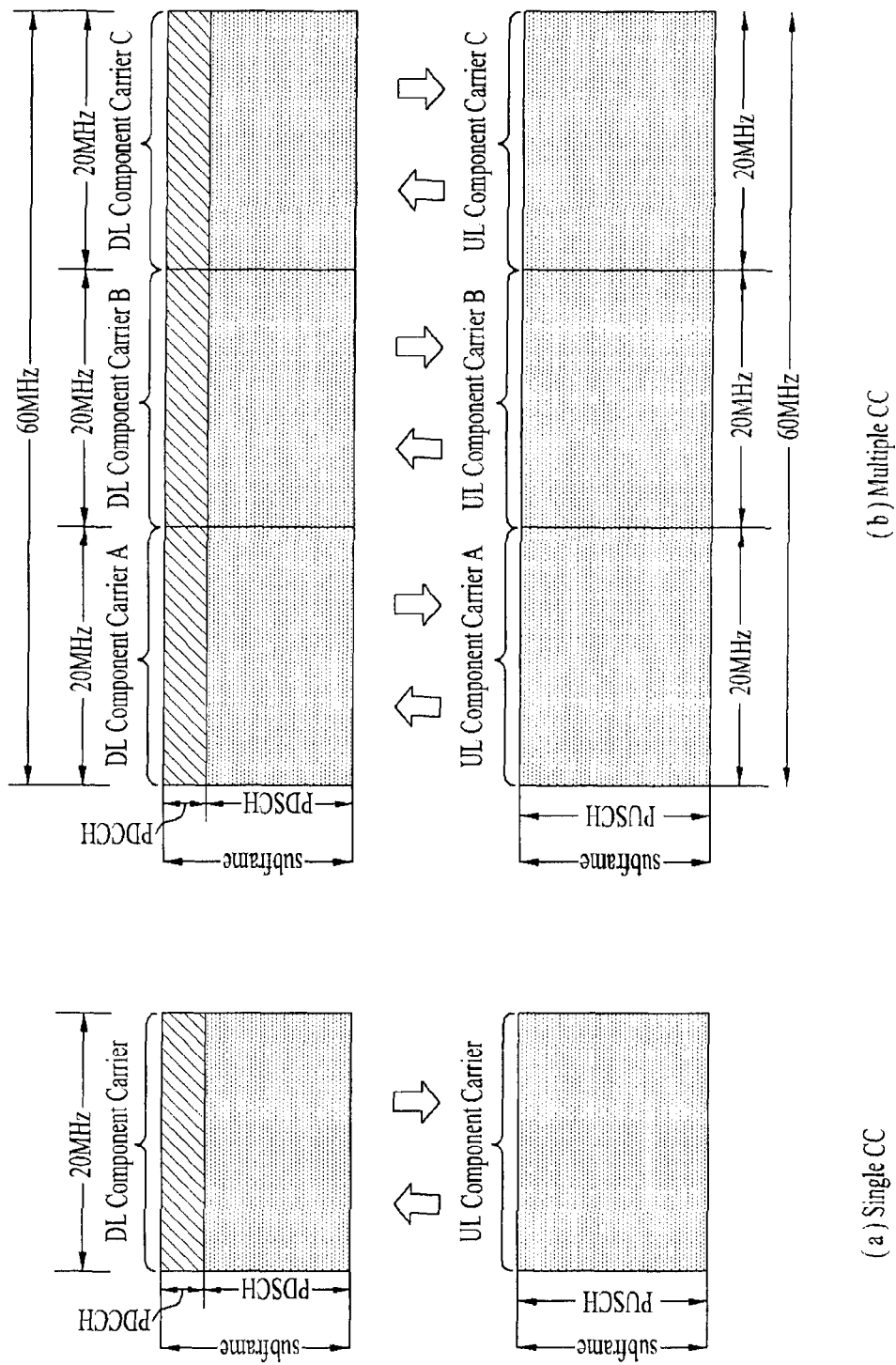
FIG. 7 is a diagram illustrating carrier aggregation.

FIG. 7 is a diagram illustrating carrier aggregation (CA). The concept of a cell, which is introduced to manage radio resources in LTE-A is described prior to the CA. A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A DL CC and a UL CC may be represented by carrier frequencies. A carrier frequency means a center frequency in a cell.

Cells may be divided into a primary cell (PCell) operating at a primary frequency and a secondary cell (SCell) operating at a secondary frequency. The PCell and Scell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC_connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCells in addition to a PCell initially configured during connection establishment after initial security activation is initiated.

CA is described with reference to FIG. 7. CA is a technology introduced to use, a wider band to meet demands for a high transmission rate. CA can be defined as aggregation of two or more component carriers (CCs) having different carrier frequencies. FIG. 7(a) shows a subframe when a conventional LTE system uses a single CC and FIG. 7(b) shows a subframe when CA is used. In FIG. 8(b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 8:
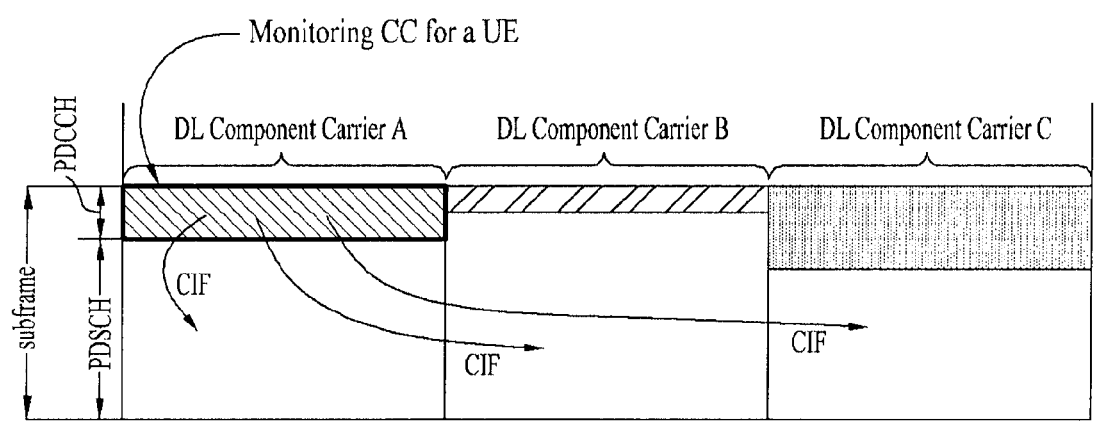
FIG. 8 is a diagram illustrating cross carrier scheduling.

FIG. 8 is a diagram illustrating cross-carrier scheduling. Cross carrier scheduling is a scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH or not. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 8, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling. When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 8, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

In a system to which the aforementioned CA is applied, a UE can receive a plurality of PDSCHs through a plurality of downlink carriers. In this case, the UE should transmit ACK/NACK for data on a UL CC in a subframe. When a plurality of ACK/NACK signals is transmitted in a subframe using PUCCH format 1a/1b, high transmit power is needed, a PAPR of uplink transmission increases and a transmission distance of the UE from the eNB may decrease due to inefficient use of a transmit power amplifier. To transmit a plurality of ACK/NACK signals through a PUCCH, ACK/NACK bundling or ACK/NACK multiplexing may be employed.

There may be generated a case in which ACK/NACK information for a large amount of downlink data according to application of CA and/or a large amount of downlink data transmitted in a plurality of DL subframes in a TDD system needs to be transmitted through a PUCCH in a subframe. In this case, the ACK/NACK information cannot be successfully transmitted using the above-mentioned ACK/NACK bundling or multiplexing when the number of ACK/NACK bits to be transmitted is greater than the number of ACK/NACK bits that can be supported by ACK/NACK bundling or multiplexing.

ACK/NACK Multiplexing Scheme

In case of ACK/NACK multiplexing, contents of ACK/NACK for a plurality of data units may be identified by combinations of ACK/NACK units used for actual ACK/NACK transmission and symbols modulated through QPSK. For example, if one ACK/NACK unit carries 2-bit information, a maximum of 2 data units are received, and HARQ ACK for each received data unit is represented by one ACK/NACK bit, a transmitter transmitting the data can recognize ACK/NACK results as shown in Table 3.

TABLE 3

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 3, HARQ-ACK(i) (i=0, 1) denotes an ACK/NACK result for data unit i. Since it is assumed that a maximum of 2 data units (data unit 0 and data unit 1) are received, an ACK/NACK result for data unit 0 is represented as HARQ-ACK(0) and an ACK/NACK result for data unit 1 is represented as HARQ-ACK(1). DTX (discontinuous transmission) represents that the data unit corresponding to HARQ-ACK(i) is not transmitted or a receiver cannot detect the data unit corresponding to HARQ-ACK(i). $n_{PUCCH,X}^{(1)}$ denotes an ACK/NACK unit used for actual ACK/NACK transmission. If a maximum of 2 ACK/NACK units are present, these ACK/NACK units can be represented as $n_{PUCCH,0}^{(1)}$ and $n_{PUCCH,1}^{(1)}$. In addition, b(0), b(1) denotes 2 bits transmitted through a selected ACK/NACK unit. Modulation symbols transmitted through an ACK/NACK unit are determined according to b(0),b(1)

For example, if the receiver successfully receive and decode 2 data units (i.e. in the case of 'ACK,ACK' in Table 3), the receiver transmits 2 bits (1, 1) using ACK/NACK unit $n_{PUCCH,1}^{(1)}$. When the receiver receives 2 data units, if the receiver fails to decode a first data unit (e.g. data unit 0 corresponding to HARQ-ACK(0)) and successfully decodes a second data unit (e.g. data unit 1 corresponding to HARQ-ARK(1)) (i.e. in the case of 'NACK/DTX, ACK' in Table 3), the receiver transmits 2 bits (0, 0) using ACK/NACK unit $n_{PUCCH,1}^{(1)}$.

As described above, it is possible to transmit ACK/NACK information for a plurality of data units using a single ACK/NACK unit by mapping a combination of selection of an ACK/NACK unit and bits of an actually transmitted ACK/NACK unit (i.e. a combination of selection of one of $n_{PUCCH,0}^{(1)}$ and $n_{PUCCH,1}^{(1)}$ in Table 3 and b(0),b(1)). ACK/NACK multiplexing for two or more data units can be easily implemented by extending the aforementioned ACK/NACK multiplexing principle.

In this ACK/NACK multiplexing scheme, when at least one ACK is present for every data unit, NACK and DTX may not be distinguished from each other (i.e. NACK and DTX may be coupled, as represented as NACK/DTX in Table 3). This is because all ACK/NACK states (i.e. ACK/NACK hypotheses) that can be generated when NACK and DTX are represented in a distinguished manner cannot be represented by only combinations of ACK/NACK units and QPSK-modulated symbols. When ACK is not present for any data unit (i.e. only NACK or DTX is present for all data units), it is possible to define one definite NACK that represents that only one of ACK/NACK results HARQ-ACK(i) corresponds to definite NACK (i.e. NACK distinguished from DTX). In this case, an ACK/NACK unit for a data unit corresponding to one definite NACK may be reserved in order to transmit a plurality of ACK/NACK signals.

Semi-Persistent Scheduling (SPS)

DL/UL SPS signals which subframe (subframe period and offset) is used for a UE to perform SPS transmission/reception to the UE through radio resource control (RRC) signaling, and then performs actual SPS activation and release through a PDCCH. That is, the UE performs SPS upon receiving the PDCCH that signals activation (or reactivation) (i.e. upon receiving a PDCCH from which SPS C-RNTI is detected) rather than performing SPS TX/RX right after being allocated SPS through RRC signaling. Specifically, upon reception of an SPS activation PDCCH, the UE may assign a frequency resource according to RB allocation designated by the PDCCH and start to perform TX/RX using a subframe period and offset allocated thereto through RRC signaling by applying modulation and a coding rate according to MCS information to TX/RX. When the UE receives a PDCCH that signals SPS release, the UE interrupts TX/RX. TX/RX interrupted in this manner may be resumed when the UE receives a PDCCH signaling activation (or reactivation) using a subframe period and offset assigned through RRC signaling according to RB allocation and MCS designated by the PDCCH.

PDCCH formats defined in 3GPP LTE include DCI format 0 for uplink and DCI formats 1, 1A, 1B, 1C, 1D, 2, 2A, 3, 3A, etc. for downlink. Control information such as a hopping flag, RB allocation, MCS (modulation coding scheme), RV (redundancy version), NDI (new data indicator), TPC (transmit power control), cyclic shift DMRS (demodulation reference signal), UL index, CQI (channel quality information) request, DL assignment index, HARQ process number, TPMI (transmitted precoding matrix indicator), PMI (precoding matrix indicator) confirmation, etc. is selected, combined and transmitted for purposes of the formats.

More specifically, when a PDCCH is used for SPS activation/release, this may validate that CRC of DCI transmitted on the PDCCH is masked with SPS C-RNTI and NDI is set to 0. In the case of SPS activation, a combination of bit fields is set to 0 and used as a virtual CRC, as shown in Table 4.

TABLE 4

| | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

The virtual CRC has additional error detection capability by checking whether a corresponding bit field value is an appointed value when an error that cannot be checked even with a CRC is generated. When a specific UE cannot detect an error generated in DCI allocated to another UE and misrecognizes the error as SPS activation thereof, the one-time error generates continuous problems because the specific UT continuously uses the corresponding resource. Accordingly, wrong detection of SPS is prevented using the virtual CRC.

In the case of SPS release, a bit field value is set as shown in Table 5 and used as a virtual CRC.

TABLE 5

|  | DCI format 0 | DCI format 1A |
|---|---|---|
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | set to all '1's |

Heterogeneous Deployment

Figure 9:
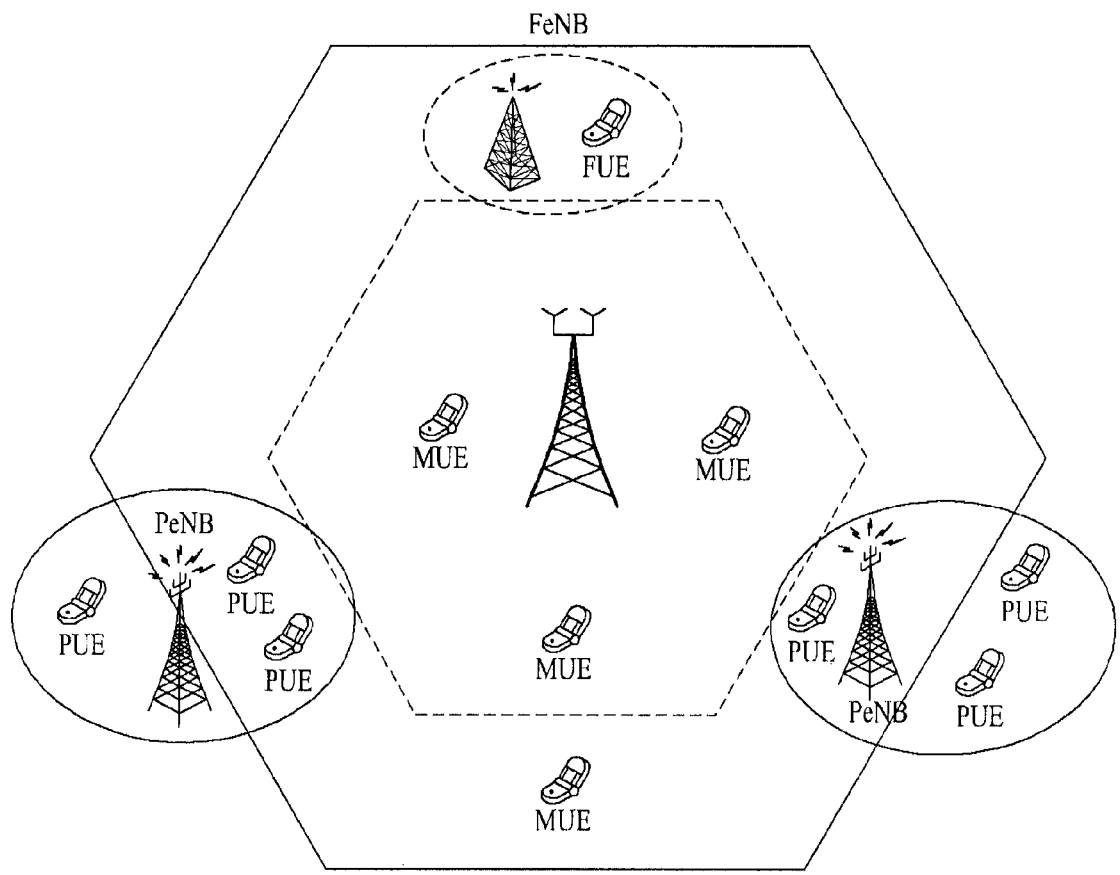
FIG. 9 illustrates heterogeneous deployment.

FIG. 9 illustrates a heterogeneous network wireless communication system including a macro eNB (MeNB) and micro eNBs (PeNB or FeNB). The term 'heterogeneous network' means a network in which an MeNB and a PeNB or FeNB coexist even when they use the same radio access technology (RAT).

The MeNB is a normal eNB of a wireless communication system having wide coverage and high transmit power. The MeNB may be referred to as a macro cell.

The PeNB or FeNB may be referred to as a micro cell, pico cell, femto cell, home eNB (HeNB), relay, etc. (the exemplified PeNB or FeNB and MeNB may be collectively referred to as transmission points). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmit power compared to the MeNB.

A UE (referred to as a macro-UE (MUE) hereinafter) may be directly served by the MeNB or a UE (referred to as a micro-UE (PUE or FUE) hereinafter) may be served by the PeNB or FeNB. In some cases, a PUE present in the coverage of the MeNB may be served by the MeNB.

The PeNB or FeNB may be classified into two types according to whether UE access is limited.

The first type is an open access subscriber group (OSG) or non-closed access subscriber group (CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Inter-Cell Interference Control (ICIC)

In the heterogeneous network environment as described above, interference between neighboring cells may be a problem. To solve this inter-cell interference, inter-cell interference control (ICIC) may be applied. Conventional ICIC can be applied to frequency resources or time resources.

As exemplary ICIC for the frequency resources, 3GPP LTE release-8 defines a scheme of dividing a given frequency region (e.g. system bandwidth) into one or more sub-regions (e.g. physical resource blocks (PRBs)) and exchanging an ICIC message for each sub-region between cells. For example, relative narrowband transmission power (RNTP) associated with downlink transmission power, UL interference overhead indication (IOI) and UL high interference indication (HII) associated with uplink interference are defined as information included in the ICIC message for the frequency resources.

The RNTP is information indicating downlink transmission power used by a cell that transmits an ICIC message in a specific frequency sub-region. For example, when an RNTP field for a specific frequency sub-region is set to a first value (e.g. 0), this represents that downlink transmission power of a corresponding cell does not exceed a threshold value in the specific frequency sub-region. When the RNTP field for the specific frequency sub-region is set to a second value (e.g. 1), this represents that the corresponding cell cannot guarantee the downlink transmission power in the specific frequency sub-region. In other words, the downlink transmission power of the cell can be regarded as low when the RNTP field is 0, whereas the downlink transmission power of the cell cannot be regarded as low when the RNTP field is 1.

The UL IOI is information indicating the quantity of uplink interference that a cell transmitting an ICIC message suffers in a specific frequency sub-region. For example, when an IOI field for a specific frequency sub-region is set to a value corresponding to a large amount of interference, this represents that a corresponding cell suffers strong uplink interference in the specific frequency sub-region. A cell receiving an ICIC message can schedule UEs using low uplink transmission power from among UEs thereof in a frequency sub-region corresponding to IOI indicating strong uplink interference. Accordingly, UEs can perform uplink transmission with low transmit power in the frequency sub-region corresponding to the IOI indicating strong uplink interference, and thus uplink interference that a neighboring cell (i.e. cell transmitting the ICIC message) suffers can be alleviated.

The UL HII is information indicating a degree of interference (or uplink interference sensitivity) that may be generated for the corresponding frequency sub-region according to uplink transmission in the cell transmitting the ICIC message. For example, when an HII field is set to a first value (e.g. 1) for a specific frequency sub-region, this represents that the cell transmitting the ICIC message may schedule UEs having high uplink transmit power for the specific frequency sub-region. On the contrary, when the HII field is set to a second value (e.g. 0) for the specific frequency sub-region, this represents that the cell transmitting the ICIC message may schedule UEs having low uplink transmission power for the specific frequency sub-region. The cell receiving the ICIC message can avoid interference from the cell transmitting the ICIC message by preferentially scheduling UEs to the frequency sub-region to which the HII field is set to the second value (e.g. 0) and scheduling UEs that can successfully operate even in a strong interference environment to the frequency sub-region to which the HII field is set to the first value (e.g. 1).

As exemplary ICIC for the time resources, 3GPP LTE-A (or 3GPP LTE release-10) defines a scheme of dividing the entire time domain into one or more time sub-regions (e.g. subframes) in the frequency domain and exchanging information on whether silencing is performed on each time sub-region between cells. The cell transmitting the ICIC message may transmit information indicating that silencing is performed in a specific subframe to neighboring cells and does not schedule a PDSCH or a PUSCH in the specific subframe. The cell receiving the ICIC message may schedule uplink and/or downlink transmission for UEs on the subframe in which silencing is performed in the cell transmitting the ICIC message.

Silencing may represent an operation in which a specific cell does not transmit signals (or transmits zero power or weak power) in a specific subframe on uplink and downlink. As an example of silencing, a specific cell can set a specific subframe as an almost blank subframe (ABS). There are two types of ABS. Specifically, one type is an ABS in a normal subframe in which a data region is vacant while a CRS is transmitted and the other type is an ABS in an MBSFN subframe in which even a CRS is not transmitted. In the ABS in a normal subframe, interference of the CRS may be present. Accordingly, the ABS in an MBSFN subframe has an advantage in terms of interference. However, use of the ABS in an MBSFN subframe is limited, and thus the two ABS may be used together.

Figure 10:
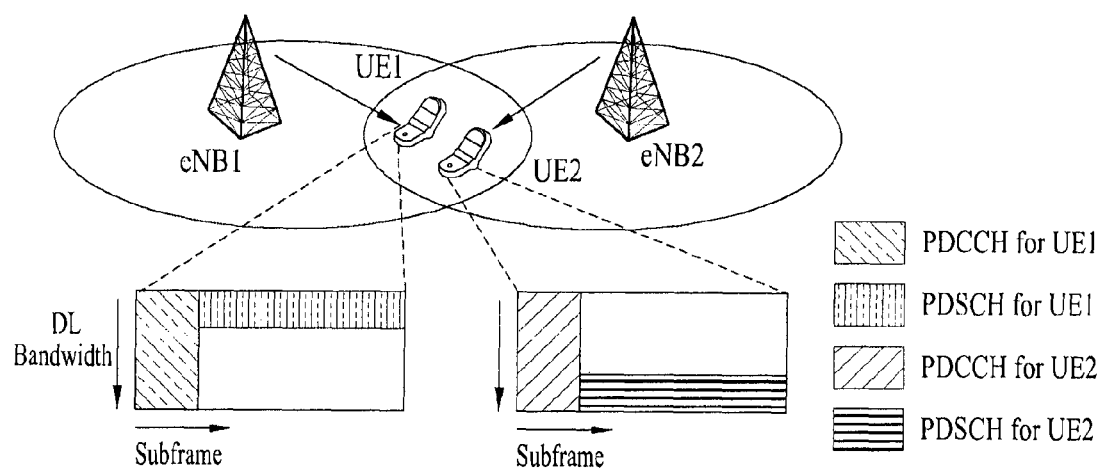
FIGS. 10 and 11 illustrate schemes for alleviating interference through scheduling in a heterogeneous network.

FIG. 10 illustrates a scheme of alleviating interference by allocating PDSCHs to UEs located at the edges of cells in orthogonal frequency regions, which can be used to exchange scheduling information between eNBs. However, a PDCCH is transmitted over the entire downlink bandwidth, as described above, and thus interference due to the PDCCH cannot be mitigated. For example, since a time-frequency region in which a PDCCH is transmitted from eNB1 to UE1 and a time-frequency region in which a PDCCH is transmitted from eNB2 to UE2 overlap, PDCCH transmission for UE1 and PDCCH transmission for UE2 interfere with each other.

Figure 11:
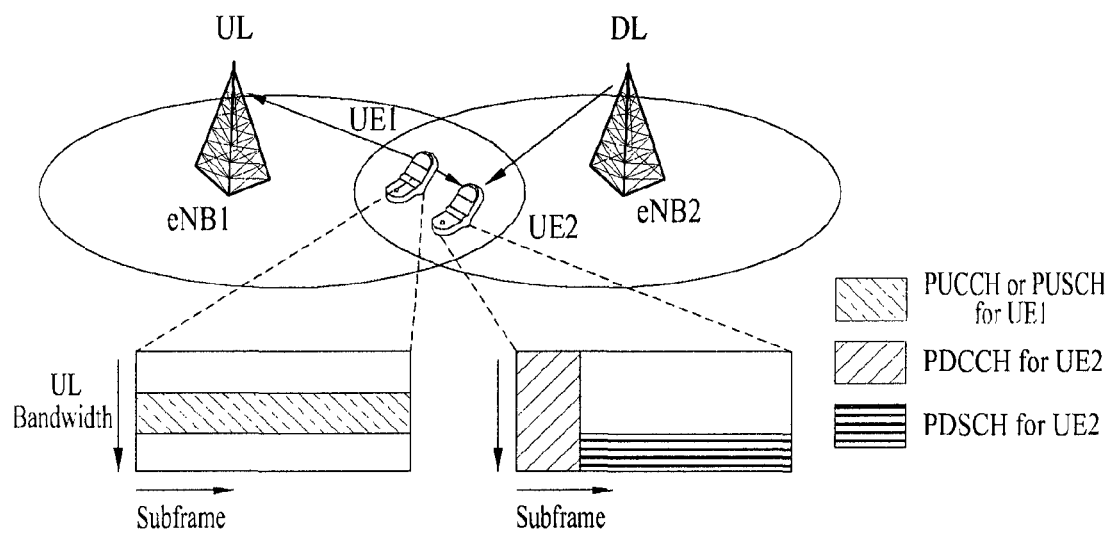

Referring to FIG. 11, a PUCCH or a PUSCH transmitted from UE1 may interfere with a PDCCH or a PDSCH received by UE2 adjacent to UE1. Here, if scheduling information is exchanged between eNB1 and eNB2, interference in the PDSCH can be avoided by allocating the UEs to orthogonal frequency regions. However, the PDCCH is affected by the PUCCH or PUSCH transmitted from UE1.

For this reason, introduction of an ePDCCH different from the PDCCH is discussed. The ePDCCH is introduced to effectively support CoMP (coordinated multipoint transmission), MU-MIMO (multiuser-multiple input multiple output) as well as to alleviate interference.

Even when the ePDCCH is introduced, it is impossible to avoid interference applied to a PHICH on which ACK/NACK information for a PUSCH is transmitted. This interference may cause PUSCH retransmission to deteriorate system performance. Furthermore, when the quantity of resources transmitted on the PHICH increases, PDCCH capacity decreases, and thus PDCCH blocking probability decreases.

Methods of Generating a Sequence of ePHICH Modulation Symbols for Coherent Detection Methods of generating a sequence of modulation symbols for an ePHICH according to embodiments of the present invention will now be described. A modulation symbol sequence described below may be mapped to one or more layers, precoded, mapped to resource elements (REs) according to an embodiment of the present invention, and transmitted through a plurality of antenna ports. While the modulation symbol sequence has a length of 12 on the assumption that the number of REs for the ePHICH is 12 in the following description, the present invention is not limited thereto and the modulation symbol sequence can have various lengths.

A method of generating a modulation symbol sequence may be summarized as generation of a bit sequence according to a predetermined coding rate from reception acknowledgement for a transport block (TB) received from a UE through a PUSCH, that is, 1-bit ACK/NACK information, generation of a block of complex-valued modulation symbols by modulating the generated bit sequence, and then application of an orthogonal sequence to the block of complex-valued modulation symbols.

The method of generating a modulation symbol sequence will be described below as two operations of;

1) generating a bit sequence from ACK/NACK information and then generating a block of complex-valued modulation symbols, and ii) applying an orthogonal sequence to the block of complex-valued modulation symbols.

First of all, the operation of generating a bit sequence from ACK/NACK information and then generating a block of complex-valued modulation symbols will now be described. ACK/NACK may be information with respect to one or more TBs. An operation of generating a block of complex-valued modulation symbols from ACK/NACK information for one TB is described first, and then an operation of generating a block of complex-valued modulation symbols from ACK/NACK information for two TBs is described.

1-bit ACK/NACK information for one TB may be converted to a bit sequence $b(i)$ according to a predetermined coding rate and then transformed to a block of complex-valued modulation symbols, $z(i)$, through BPSK using Tables 6 and 7.

TABLE 6

| b(i) | I | Q |
| --- | --- | --- |
| 0 | $1/\sqrt{2}$ | $1/\sqrt{2}$ |
| 1 | $-1/\sqrt{2}$ | $-1/\sqrt{2}$ |

TABLE 7

| b(i) | z(i) |
| --- | --- |
| 0 | 1 |
| 1 | −1 |

For example, when the 1-bit ACK/NACK information is 1, a 12-bit sequence $b(i)=1$, $i=0, \ldots, M_{bit}-1$, $M_{bit}=12$, which is generated by repeating the ACK/NACK information twelve times according to a coding rate of 1/12, can be modulated using BPSK according to Table 7 to generate a block of complex-valued modulation symbols, $z(i)=-1$, $i=0$, $M_S-1$, $M_S=12$.

When the ACK/NACK information corresponds to 1, a 3-bit sequence $b(i)=1$, $i=0, \ldots, M_{bit}=3$, which is generated by repeating the ACK/NACK information three times according to a coding rate of 1/3, may be mapped according to Table 7 to generate a block of complex-valued modulation symbols, $z(i)=-1$, $i=0$, $M_S=1$, $M_S=3$.

If a coding rate of 1 is used, that is, when the ACK/NACK information is not repeated, a block of complex-valued modulation symbols, $b(i)=1$, $i=0$, $M_{bit}-1$, $M_{bit}=1$ can be generated from a 1-bit sequence $b(i)=1$, $i=0, \ldots, M_{bit}-1$, $M_{bit}=1$ using Table 7.

The operation of generating a block of complex-valued modulation symbols from 2-bit ACK/NACK information for 2 TBs will now be described with reference to FIG. 12. In description associated with FIG. 12, 2 TBs may be transmitted on a PUSCH from a UE. Specifically, the UE may map the 2 TBs to 2 to 4 layers, precode the mapped TBs, and then transmit the precoded TBs through a plurality of antennas.

Otherwise, the 2 TBs may be TBs respectively transmitted through PUSCHs from 2 UEs each using one TB.

FIG. 12(a) illustrates a method of generating a 24-bit sequence according to a coding rate of 1/12 from 2-bit ACK/NACK information. Referring to FIG. 12(a), ACK/NACK information PUSCH TB#0 A/N and PUSCH TB#1 A/N for 2 TBs can be generated as the 24-bit sequence $b(i)=1$, $i=0, \ldots, M_{bit}-1$, $M_{bit}=24$ according to the coding rate of 1/12. Here, the 24-bit sequence may be generated in various manners for respective cases, as shown in the figure. A case in which PUSCH TB#0 A/N is 1 and PUSCH TB#1 A/N is 0 is exemplified for convenience of description.

$$b(i) = \begin{cases} 1 & \text{for } i \bmod 2 = 0 \\ 0 & \text{for } i \bmod 2 = 1 \end{cases} \quad \text{[Equation 1]}$$

$i = 0, \ldots, M_{bit} - 1,$ $M_{bit} = 24$

Case 2 and Case 3 can be represented by the following equations 2 and 3.

$$b(i) = \begin{cases} 1 & \text{for } i \bmod 4 = 0, 1 \\ 0 & \text{for } i \bmod 4 = 2, 3 \end{cases} \quad \text{[Equation 2]}$$

$i = 0, \ldots, M_{bit} - 1,$ $M_{bit} = 24$ $$b(i) = \begin{cases} 1 & \text{for } i \bmod 8 = 0, 1, 2, 3 \\ 0 & \text{for } i \bmod 8 = 4, 5, 6, 7 \end{cases} \quad \text{[Equation 3]}$$

$i = 0, \ldots, M_{bit} - 1,$ $M_{bit} = 24$

Case 4 and Case 5 can be represented by the following equations 4 and 5.

$$b(i) = \begin{cases} 1 & \text{for } \lfloor i/M_{bit}/2 \rfloor \bmod 2 = 0 \\ 0 & \text{for } \lfloor i/M_{bit}/2 \rfloor \bmod 2 = 1 \end{cases} \quad \text{[Equation 4]}$$

$i = 0, \ldots, M_{bit} - 1,$ $M_{bit} = 24$ $$b(i) = \begin{cases} 1 & \text{for } \lfloor i/M_{bit}/2 \rfloor = 0 \\ 0 & \text{for } \lfloor i/M_{bit}/2 \rfloor = 1 \end{cases} \quad \text{[Equation 5]}$$

$i = 0, \ldots, M_{bit} - 1,$ $M_{bit} = 24$

The 24-bit sequence generated in this manner may be converted to a block of complex-valued modulation symbols, $z(i)$, $i=0, \ldots, M_s-1$, $M_s=12$, using a QPSK modulation mapping table such as Table 8 or Table 9.

TABLE 8

| b(i), b(i + 1) | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

TABLE 9

| b(i), b(i + 1) | I | Q |
|---|---|---|
| 00 | 1 | 0 |
| 01 | 0 | -1 |
| 10 | 0 | 1 |
| 11 | -1 | 0 |

For example, when PUSCH TB#0 A/N is 1 and PUSCH TB#1 A/N is 0, in Case 1, the block of complex-valued modulation symbols, modulated using Table 9, can be represented by the following equation 6.

$$z(i) = j, \, i = 0, \ldots, M_s - 1, \, M_s = 12 \quad \text{[Equation 6]}$$

In Case 2 and Case 3, the block of complex-valued modulation symbols can be represented by the following equations 7 and 8, respectively.

$$z(i) = \begin{cases} -1 & \text{for } i \bmod 2 = 0 \\ 1 & \text{for } i \bmod 2 = 1 \end{cases} \quad \text{[Equation 7]}$$

$i = 0, \ldots, M_s - 1,$ $M_s = 12$ $$z(i) = \begin{cases} -1 & \text{for } i \bmod 4 = 0, 1 \\ 1 & \text{for } i \bmod 4 = 2, 3 \end{cases} \quad \text{[Equation 8]}$$

$i = 0, \ldots, M_s - 1,$ $M_s = 12$

In Case 4 and Case 5, the block of complex-valued modulation symbols can be represented by the following equations 9 and 10, respectively.

$$z(i) = \begin{cases} -1 & \text{for } \lfloor i/M_s/2 \rfloor \bmod 2 = 0 \\ 1 & \text{for } \lfloor i/M_s/2 \rfloor \bmod 2 = 1 \end{cases} \quad \text{[Equation 9]}$$

$i = 0, \ldots, M_s - 1,$ $M_s = 12$ $$z(i) = \begin{cases} -1 & \text{for } \lfloor i/M_s/2 \rfloor = 0 \\ 1 & \text{for } \lfloor i/M_s/2 \rfloor = 1 \end{cases} \quad \text{[Equation 10]}$$

$i = 0, \ldots, M_s - 1,$ $M_s = 12$

FIG. 12(b) illustrates a method of generating a 12-bit sequence from 2-bit ACK/NACK information using a coding rate of 1/6. The 12-bit sequence may be modulated through BPSK to generate a length-12 block of complex-valued modulation symbols or modulated through QPSK to generate a length-6 block of complex-valued modulation symbols.

The following table 10 shows a method of generating a bit sequence and modulating the bit sequence using BPSK or QPSK to generate a block of complex-valued modulation symbols in Case 1, Case 2, Case 3 and Case 4 as mathematical expressions on the assumption that PUSCH TB#0 A/N is 1, PUSCH TB#1 A/N is 0, BPSK uses Table 7, and QPSK uses Table 9.

TABLE 10

| Generation of bit sequence | Case 1 | $b(i) = \begin{cases} 1 & \text{for } i \bmod 2 = 0 \\ 0 & \text{for } i \bmod 2 = 1 \end{cases}$ |
|---|---|---|
| | | $i = 0, \ldots, M_{bit} - 1, M_{bit} = 12$ |

TABLE 10-continued

| | | | |
|---|---|---|---|
| | case 2 | | $b(i) = \begin{cases} 1 & \text{for } i \bmod 4 = 0, 1 \\ 0 & \text{for } i \bmod 4 = 2, 3 \end{cases}$ <br> $i = 0, \ldots, M_{bit} - 1, M_{bit} = 12$ |
| | Case 3 | | $b(i) = \begin{cases} 1 & \text{for } \lfloor i/M_{bit}/4 \rfloor \bmod 2 = 0 \\ 0 & \text{for } \lfloor i/M_{bit}/4 \rfloor \bmod 2 = 1 \end{cases}$ <br> $i = 0, \ldots, M_{bit} - 1, M_{bit} = 12$ |
| | Case 4 | | $b(i) = \begin{cases} 1 & \text{for } \lfloor i/M_{bit}/2 \rfloor = 0 \\ 0 & \text{for } \lfloor i/M_{bit}/2 \rfloor = 1 \end{cases}$ <br> $i = 0, \ldots, M_{bit} - 1, M_{bit} = 12$ |
| Generation of block of modulation symbols | case 1 | BPSK | $z(i) = \begin{cases} -1 & \text{for } i \bmod 2 = 0 \\ 1 & \text{for } i \bmod 2 = 1 \end{cases}$ <br> $i = 0, \ldots, M_s - 1, M_s = 12$ |
| | | QPSK | $z(i) = j$ <br> $i = 0, \ldots, M_s - 1, M_s = 6$ |
| | case 2 | BPSK | $z(i) = \begin{cases} -1 & \text{for } i \bmod 4 = 0, 1 \\ 1 & \text{for } i \bmod 4 = 2, 3 \end{cases}$ <br> $i = 0, \ldots, M_s - 1, M_s = 12$ |
| | | QPSK | $z(i) = \begin{cases} -1 & \text{for } i \bmod 2 = 0, 1 \\ 1 & \text{for } i \bmod 2 = 2, 3 \end{cases}$ <br> $i = 0, \ldots, M_s - 1, M_s = 6$ |
| | case 3 | BPSK | $z(i) = \begin{cases} -1 & \text{for } \lfloor i/M_{bit}/4 \rfloor \bmod 2 = 0 \\ 1 & \text{for } \lfloor i/M_{bit}/4 \rfloor \bmod 2 = 1 \end{cases}$ <br> $i = 0, \ldots, M_s - 1, M_s = 12$ |
| | | QPSK | $z(i) = \begin{cases} -1 & \text{for } i \bmod 3 = 0 \\ j & \text{for } i \bmod 3 = 1 \\ 1 & \text{for } i \bmod 3 = 2 \end{cases}$ <br> $i = 0, \ldots, M_s - 1, M_s = 6$ |
| | case 4 | BPSK | $z(i) = \begin{cases} -1 & \text{for } \lfloor i/M_s/2 \rfloor = 0 \\ 1 & \text{for } \lfloor i/M_s/2 \rfloor = 1 \end{cases}$ <br> $i = 0, \ldots, M_s - 1, M_s = 12$ |
| | | QPSK | $z(i) = \begin{cases} -1 & \text{for } \lfloor i/M_s/2 \rfloor = 0 \\ 1 & \text{for } \lfloor i/M_s/2 \rfloor = 1 \end{cases}$ <br> $i = 0, \ldots, M_s - 1, M_s = 6$ |

FIG. 12(c) illustrates a method of generating a 6-bit sequence from 2-bit ACK/NACK information using a coding rate of ⅓. The 6-bit sequence may be modulated through BPSK to generate a length-6 block of complex-valued modulation symbols or modulated through QPSK to generate a length-3 block of complex-valued modulation symbols.

In this case, the bit sequence and the block of complex-valued modulation symbols generated using QPSK in Case 1 and Case 3 can be represented as shown in Table 11. PUSCH TB#0 A/N is 1, PUSCH TB#1 A/N is 0, BPSK uses Table 7, and QPSK uses Table 9.

TABLE 11

| | | | |
|---|---|---|---|
| Generation of bit sequence | case 1 | | $b(i) = \begin{cases} 1 & \text{for } i \bmod 2 = 0 \\ 0 & \text{for } i \bmod 2 = 1 \end{cases}$ <br> $i = 0, \ldots, M_{bit} - 1, M_{bit} = 6$ |

TABLE 11-continued

| | | | |
|---|---|---|---|
| | case 3 | | $b(i) = \begin{cases} 1 & \text{for } \lfloor i/M_{bit}/2 \rfloor = 0 \\ 0 & \text{for } \lfloor i/M_{bit}/2 \rfloor = 1 \end{cases}$ <br> $i = 0, \ldots, M_{bit} - 1, M_{bit} = 6$ |
| Generation of block of modulation symbols | case 1 | BPSK | $z(i) = \begin{cases} -1 & \text{for } i \bmod 2 = 0 \\ 1 & \text{for } i \bmod 2 = 1 \end{cases}$ <br> $i = 0, \ldots, M_s - 1, M_s = 6$ |
| | | QPSK | $z(i) = j$ <br> $i = 0, \ldots, M_s - 1, M_s = 3$ |
| | case 3 | BPSK | $z(i) = \begin{cases} -1 & \text{for } \lfloor i/M_s/2 \rfloor = 0 \\ 1 & \text{for } \lfloor i/M_s/2 \rfloor = 1 \end{cases}$ <br> $i = 0, \ldots, M_s - 1, M_s = 6$ |
| | | QPSK | $z(i) = \begin{cases} -1 & \text{for } \lfloor i/M_s/2 \rfloor = 0 \\ 1 & \text{for } \lfloor i/M_s/2 \rfloor = 1 \end{cases}$ <br> $i = 0, \ldots, M_s - 1, M_s = 6$ |

Unlike the methods illustrated in FIG. 12, it is possible to generate a block of complex-valued modulation symbols from 2-bit ACK/NACK information using a coding rate of 1, that is, without repeating ACK/NACK information bits.

For example, when PUSCH TB#0 A/N is 1, PUSCH TB#1 A/N is 0, if these bits are respectively configured as a most significant bit (MSB) and a least significant bit (LSB) and length-2 modulation symbols are configured, a bit sequence $b(i)$, $i=0, \ldots, M_{bit}-1$ having 2 bits ($M_{bit}=2$) can be represented by the following equation 11.

$$b(i) = \begin{cases} 1 & (TB \; \#0 \; A/N) \; \text{for } i = 0 \\ 0 & (TB \; \#1 \; A/N) \; \text{for } i = 1 \end{cases} \quad \text{[Equation 11]}$$

By mapping the bit sequence using the modulation mapping table of Table 7, a block of complex-valued modulation symbols, $z(i)$, $i=0, \ldots, M_s-1$, $M_s=2$, can be generated. The block of complex-valued modulation symbols can be represented by the following equation 12.

$$z(i) = \begin{cases} -1 & \text{for } i = 0 \\ 1 & \text{for } i = 1 \end{cases} \quad \text{[Equation 12]}$$

$i = 0, \ldots, M_s - 1,$ $M_s = 2$

If the QPSK modulation mapping table of Table 9 is used, the block of complex-valued modulation symbols can be represented by the following equation 13.

$$z(i)=j$$

$i=0, \ldots, M_s-1, M_s-1$ [Equation 13]

A description will be given of ii) the procedure of applying an orthogonal sequence to modulation symbol blocks in various lengths to generate a modulation symbol sequence, which follows i) the procedure of generating a bit sequence from ACK/NACK information and then generating a block of complex-valued modulation symbols.

For reference, a modulation symbol sequence $z(i)$ is identical to the block of complex-valued modulation symbols, z(i), if the block of complex-valued modulation symbols has a length of 12 ($M_s=12$) and the orthogonal sequence is not applied to the block of complex-valued modulation symbols.

In the following description, the orthogonal sequence may be a Walsh code (or Walsh-Hadamard code) or a DFT code. The Walsh code has orthogonality and is mainly used to identify a channel of each CDMA UE because there is no correlation between codes. The Walsh code has a property that 0s (or −1s) and 1s are obtained when multiplication (Exclusive-OR) is performed on different code elements and the average of 0s and 1s becomes 0. In addition, the number of bits of one type equals the number of bits of the other type. The following table 12 shows Walsh codes applicable to the embodiments of the present invention.

TABLE 12

| Sequence index $n_{PHICH}^{seq}$ | Orthogonal sequence | |
|---|---|---|
| | Normal cyclic prefix $N_{SF}^{PHICH}=4$ | Extended cyclic prefix $N_{SF}^{PHICH}=2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The DFT code also has orthogonality. A DFT matrix is a representation of discrete Fourier transform (DFT) in the form of matrix multiplication. The DFT code can be generated using the DFT matrix. N-point DFT can be represented as an N×N matrix multiplication such as X=Wx. Here, X is an input signal and X is a signal obtained by performing DFT on the input signal. W having a size of N×N can be defined as $$W = \left(\frac{\omega^{jk}}{\sqrt{N}}\right)_{j,k=0,\ldots,N-1}.$$

This can be represented by the following equation 14.

$$W = \frac{1}{\sqrt{N}}\begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ \vdots & \vdots & \vdots & \vdots & & \vdots \\ 1 & \omega^{N-1} & \omega^{2(N-1)} & \omega^{3(N-1)} & \ldots & \omega^{(N-1)(N-1)} \end{bmatrix}$$ [Equation 14]

ω is N-th primitive root of unity $$e^{\frac{2\pi i}{N}}$$

where $i=\sqrt{-1}$. The following table 13 shows DFT sequences applicable to the embodiments of the present invention.

TABLE 13

| Sequence index $\overline{n}_{oc}^{(\tilde{p})}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

When the length of the block of complex-valued modulation symbols to which the orthogonal sequence is applied is 12, a) spreading using the orthogonal sequence may not be applied. If the length of the block of complex-valued modulation symbols is shorter than 12, b) a modulation symbol sequence spread using the orthogonal sequence can be generated. Cases a) and b) will now be described.

a) Case in which Spreading Using the Orthogonal Sequence is not Performed

The modulation symbol sequence d(i) can be generated by multiplying the block of complex-valued modulation symbols, z(i), by an orthogonal sequence (Walsh code or DFT code). Specifically, the modulation symbol sequence can be generated by multiplying the block of complex-valued modulation symbols z(i), i=0, ..., $M_s$−1 having a length of $M_s$=12 by respective elements of an orthogonal sequence [w(0) ... w($N^{PHICH}$−1)] having a length of 4($N^{PHICH}$=4) without spreading the block of complex-valued modulation symbols ($M_{sym}=M_s$). Here, the modulation symbol sequence d(i), i=0, ..., $M_{sym}$−1 can be represented by the following equation 15.

$$d(i)=w(i \bmod N^{PHICH})\cdot z(i), i=0, \ldots, M_{sym}-1 \quad \text{[Equation 15]}$$

FIG. 13(a) shows a length-12 modulation symbol sequence obtained using the orthogonal sequence having a normal cyclic prefix and a length of 4($N^{PHICH}$=4) and corresponding to sequence index #1 in Table 12. The orthogonal sequence is repeated three times as shown in FIG. 13(b).

FIG. 13(b) shows a modulation symbol sequence generated using a length-3 DFT code as the orthogonal sequence. Here, the orthogonal sequence corresponding to sequence index #1 in Table 13 is repeated four times.

Different orthogonal sequence lengths or the same orthogonal sequence length may be used for a normal cyclic prefix case and an extended cyclic prefix case.

If the length of the orthogonal sequence equals the length of the block of complex-valued modulation symbols, the modulation symbol sequence can be generated by applying the orthogonal sequence to the block of complex-valued modulation symbols without repeating the orthogonal sequence. Specifically, when a block of complex-valued modulation symbols z(i), i=0, ..., $M_s$−1 having a length of 12 is multiplied by an orthogonal sequence [w(0) ... w($N^{PHICH}$−1)] having a length of 12 ($N^{PHICH}$12), a modulation symbol sequence represented by the following equation 16 is generated.

$$d(i)=w(i \bmod N^{PHICH})\cdot z(i), i=0, \ldots, M_{sym}-1 \quad \text{[Equation 16]}$$

Here, the length-12 orthogonal sequence may be selected from the following tables 14 and 15.

TABLE 14

| Sequence index $n_{PHICH}^{seq}$ | Orthogonal sequence Normal cyclic prefix $N^{PHICH}=12$ |
|---|---|
| 0 | [+1 +1 +1 +1 +1 +1 +1 +1 +1 +1 +1 +1] |
| 1 | [+1 −1 +1 −1 +1 −1 +1 −1 +1 −1 +1 −1] |
| 2 | [+1 +1 +1 +1 +1 +1 −1 −1 −1 −1 −1 −1] |

TABLE 14-continued

| Sequence index $n_{PHICH}^{seq}$ | Orthogonal sequence Normal cyclic prefix $N^{PHICH} = 12$ |
|---|---|
| 3 | [+j +j +j +j +j +j +j +j +j +j +j +j] |
| 4 | [+j −j +j −j +j −j +j −j +j −j +j −j] |
| 5 | [+j +j +j +j +j +j −j −j −j −j −j −j] |

TABLE 15

| Sequence index $n_{PHICH}^{seq}$ | Orthogonal sequence Normal cyclic prefix $N^{PHICH} = 12$ |
|---|---|
| 0 | [1 1 1 1 1 1 1 1 1 1 1 1] |
| 1 | [1 $e^{j\pi/6}$ $e^{j\pi/3}$ $e^{j\pi/2}$ $e^{j2\pi/3}$ $e^{j5\pi/6}$ $e^{j\pi}$ $e^{j7\pi/6}$ $e^{j4\pi/3}$ $e^{j3\pi/2}$ $e^{j5\pi/3}$ $e^{j11\pi/6}$] |
| 2 | [1 $e^{j\pi/3}$ $e^{j2\pi/3}$ $e^{j\pi}$ $e^{j4\pi/3}$ $e^{j5\pi/3}$ 1 $e^{j\pi/3}$ $e^{j2\pi/3}$ $e^{j\pi}$ $e^{j4\pi/3}$ $e^{j5\pi/3}$] |
| 3 | [1 $e^{j\pi/2}$ $e^{j\pi}$ $e^{j3\pi/2}$ 1 $e^{j\pi/2}$ $e^{j\pi}$ $e^{j3\pi/2}$ 1 $e^{j\pi/2}$ $e^{j\pi}$ $e^{j3\pi/2}$] |
| 4 | [1 $e^{j2\pi/3}$ $e^{j4\pi/3}$ 1 $e^{j2\pi/3}$ $e^{j4\pi/3}$ 1 $e^{j2\pi/3}$ $e^{j4\pi/3}$ 1 $e^{j2\pi/3}$ $e^{j4\pi/3}$] |
| 5 | [1 $e^{j5\pi/6}$ $e^{j5\pi/3}$ $e^{j\pi/2}$ $e^{j4\pi/3}$ $e^{j\pi/6}$ $e^{j11\pi/6}$ $e^{j2\pi/3}$ $e^{j3\pi/2}$ $e^{j\pi/3}$ $e^{j7\pi/6}$ 1] |
| 6 | [1 $e^{j\pi}$ 1 $e^{j\pi}$ 1 $e^{j\pi}$ 1 $e^{j\pi}$ 1 $e^{j\pi}$ 1 $e^{j\pi}$] |
| 7 | [1 $e^{j7\pi/6}$ $e^{j\pi/3}$ $e^{j4\pi/3}$ $e^{j\pi/2}$ $e^{j5\pi/3}$ $e^{j5\pi/6}$ 1 $e^{j7\pi/6}$ $e^{j\pi/3}$ $e^{j4\pi/3}$ $e^{j\pi/2}$] |
| 8 | [1 $e^{j4\pi/3}$ $e^{j2\pi/3}$ 1 $e^{j4\pi/3}$ $e^{j2\pi/3}$ 1 $e^{j4\pi/3}$ $e^{j2\pi/3}$ 1 $e^{j4\pi/3}$ $e^{j2\pi/3}$] |
| 9 | [1 $e^{j3\pi/4}$ $e^{j\pi}$ $e^{j\pi/2}$ 1 $e^{j3\pi/4}$ $e^{j\pi}$ $e^{j\pi/2}$ 1 $e^{j3\pi/4}$ $e^{j\pi}$ $e^{j\pi/2}$] |
| 10 | [1 $e^{j5\pi/3}$ $e^{j4\pi/3}$ $e^{j\pi}$ $e^{j2\pi/3}$ $e^{j\pi/3}$ 1 $e^{j5\pi/3}$ $e^{j4\pi/3}$ $e^{j\pi}$ $e^{j2\pi/3}$ $e^{j\pi/3}$] |
| 11 | [1 $e^{j11\pi/6}$ $e^{j5\pi/3}$ $e^{j3\pi/2}$ $e^{j4\pi/3}$ $e^{j7\pi/6}$ $e^{j\pi}$ $e^{j5\pi/6}$ $e^{j2\pi/3}$ $e^{j\pi/2}$ $e^{j\pi/3}$ $e^{j\pi/6}$] |

FIG. 14(a) illustrates generation of a length-12 modulation symbol sequence using the orthogonal sequence corresponding to sequence index #1 in Table 14 and FIG. 14(b) illustrates generation of a modulation symbol sequence using the orthogonal sequence corresponding to sequence index #1 in Table 15.

b) Case in which Spreading is Performed using the Orthogonal Sequence

A description will be given of a method of generating a modulation symbol sequence spread using an orthogonal sequence when the length of the block of complex-valued modulation symbols is less than the number (e.g. 12) of REs for an ePHICH.

The modulation symbol sequence may be generated by applying an orthogonal sequence [w(0) ... w($N^{PHICH}$−1)] having a length of 4 ($N^{PHICH}$=4) to a length-3 ($M_s$=3) block of complex-valued modulation symbols z(i), i=0, ..., $M_s$−1. Here, modulation symbol sequence d(i), i=0, ..., $M_{sym}$−1 can be represented using the following equation 17.

$$d(i) = w(i \bmod N^{PHICH}) \cdot z(\lfloor i/N^{PHICH} \rfloor), i=0, \ldots, M_{sym}-1 \quad \text{[Equation 17]}$$

That is, the method of generating a modulation symbol sequence through spreading using an orthogonal sequence can be performed in such a manner that the respective symbols of the block of complex-valued modulation symbols are sequentially multiplied by the orthogonal sequence, as in Equation 17.

Alternatively, when the length of the block of complex-valued modulation symbols is 4, a length-3 orthogonal sequence may be used.

Figure 15:
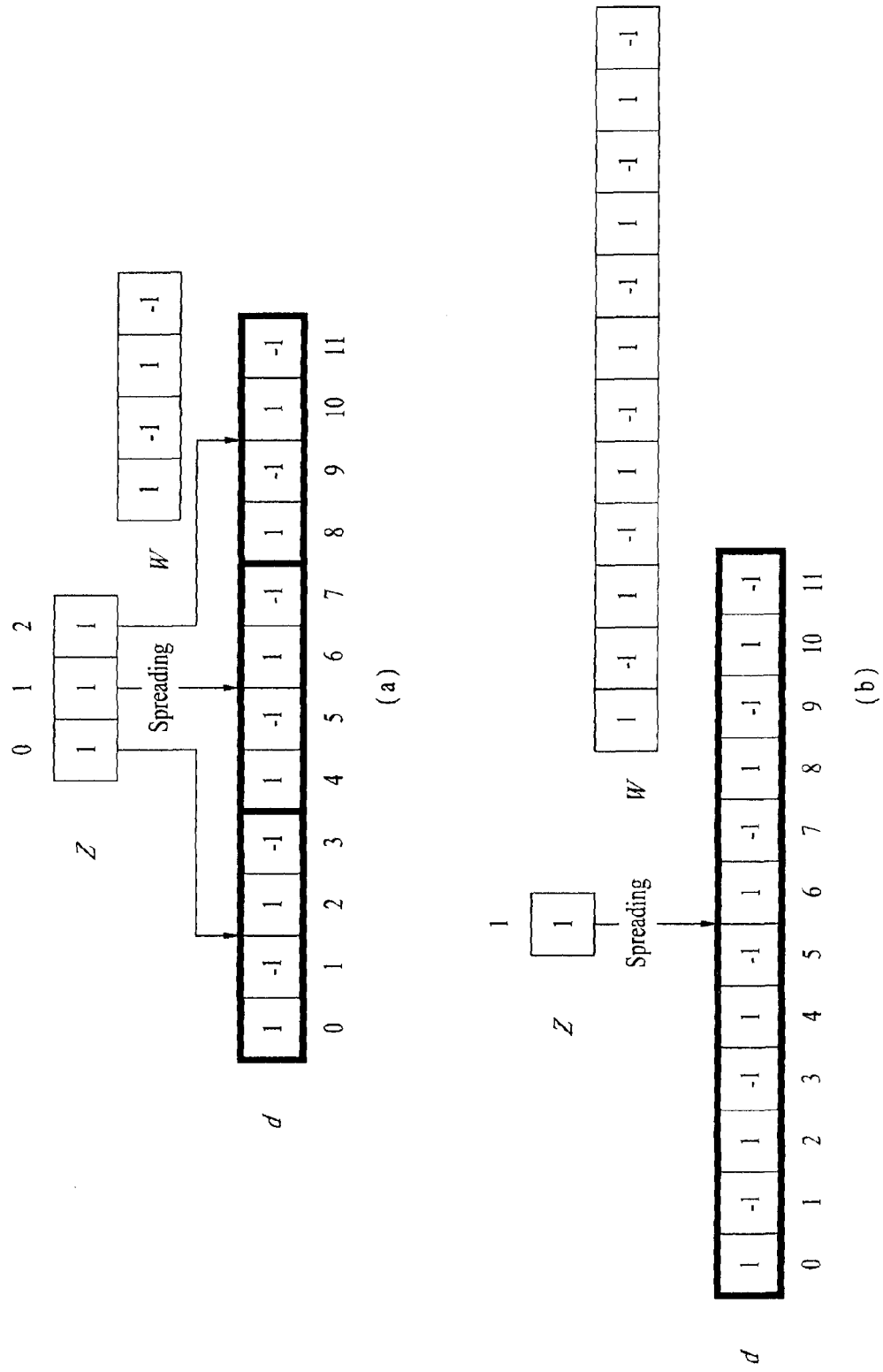

FIG. 15(a) illustrates a scheme of generating a length-12 modulation symbol sequence using the orthogonal sequence having a normal cyclic prefix and a length of 4($N^{PHICH}$=4) and corresponding to sequence index #1, shown in Table 12. That is, symbols 0, 1 and 2 of a block of complex-valued modulation symbols can be sequentially multiplied by the orthogonal sequence to generate the modulation symbol sequence.

FIG. 15(b) illustrates a scheme of generating a modulation symbol sequence using the orthogonal sequence corresponding to sequence index #1 shown in Table 14. Specifically, a modulation symbol sequence d(i), i=0, ..., $M_{sym}$−1 can be generated by sequentially multiplying each symbol of a block of complex-valued modulation symbols z(i) by elements of an orthogonal sequence w(i mod $N^{PHICH}$).

When the orthogonal sequence is used to generate a modulation symbol sequence, as described above, the orthogonal sequence may be allocated UE specifically, TB specifically, or UE-and-TB specifically.

Different orthogonal sequences may be respectively allocated to UEs such that the same resource can be simultaneously used by the UEs. For example, if sequence index #0 is allocated to UE #0 and sequence index #1 is allocated to UE #1, PUSCH ACK/NACK information of UE #0 and PUSCH ACK/NACK information of UE #1 can be simultaneously transmitted using the same resource. When UE multiplexing is employed in this manner, PUSCH ACK/NACK of many UEs can be simultaneously transmitted using a small amount of resources.

For a UE, different orthogonal sequences may be respectively allocated to 2 TBs to simultaneously transmit ACK/NACK information corresponding to 2 TBs using the same resource when a maximum number of TBs that can be transmitted by a UE is 2. For example, if a PUSCH of UE #0 is transmitted using 2 TBs, sequence index #0 may be allocated to PUSCH TB #0 of UE #0 and sequence index #1 may be allocated to PUSCH TB #1 of UE #0.

Furthermore, it is possible to allocate different orthogonal sequences to respective UEs and to respective TBs each transmitting a PUSCH of each UE. For example, when each of PUSCHs of UE #0 and UE #1 is transmitted using 2 TBs, sequence index #0 may be allocated to PUSCH TB #0 of UE #0, sequence index #1 may be allocated to PUSCH TB #1 of UE #0, sequence index #2 may be allocated to PUSCH TB #0 of UE #1, and sequence index #3 may be allocated to PUSCH TB #1 of UE #1.

The aforementioned method of generating a modulation symbol sequence is based on the assumption of coherent detection at a UE. That is, to demodulate a modulation symbol sequence generated using the above-described method, a UE can demodulate the modulation sequence after acquiring channel information using a CRS, DMRS, etc. A description will be given of a method of generating a modulation symbol sequence for non-coherent detection, which can be used when channel information is unknown (although a modulation scheme such as BPSK is not used for a sequence for non-coherent detection, the term 'modulation symbol sequence' is used in the following description in order to stress correspondence between the modulation symbol sequence for non-coherent detection and the aforementioned modulation symbol sequence for coherent detection).

Methods of Generating a Sequence of ePHICH Modulation Symbols for Non-Coherent Detection Methods of generating a modulation symbol sequence from 1-bit ACK/NACK information corresponding to a TB will now be described. ACK/NACK information for a PUSCH received from a UE can be mapped to an orthogonal sequence and then configured as a modulation symbol sequence. If an ePHICH is configured of 12 REs, the length $N^{PHICH}$ of orthogonal sequence W can have various values such as 2, 4, 6, 12, etc. If the length of the orthogonal sequence is 12, a modulation symbol sequence can be determined without performing repetition. When the length of the orthogonal sequence is less than 12, repetition can be performed to correspond to the length of 12. A modulation symbol sequence d(i) generated in this manner can be represented by the following equation 18.

$$d(i)=w(i \bmod N^{PHICH}), i=0, \ldots, M_{sym}-1 \quad \text{[Equation 18]}$$

Figure 16:
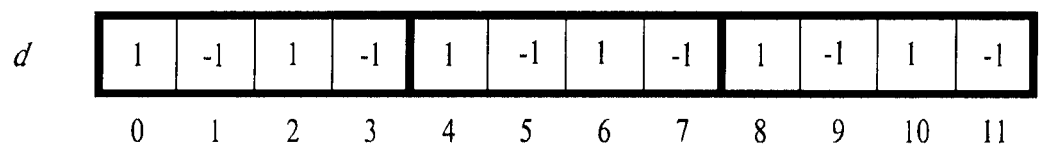
FIGS. 16 and 17 are diagrams illustrating schemes for generating a sequence of modulation symbols for non-coherent detection according to embodiments of the present invention.

FIG. 16 illustrates generation of a modulation symbol sequence using the orthogonal sequence having the normal cyclic prefix and a length of 4 ($N^{PHICH}$) shown in Table 12. Here, sequence indexes may be previously set such that sequence index #0 corresponds to NACK and sequence index #1 corresponds to ACK. Orthogonal sequences corresponding to sequence indexes #4 to #7 including imaginary components are not used because the modulation symbol sequence is for non-coherent detection. When the TB transmitted on the PUSCH from the UE corresponds to ACK, orthogonal sequence [1 −1 1 −1] corresponding to sequence index #1 is selected. Since the length of this orthogonal sequence is 4, a length-12 modulation symbol sequence can be generated through three repetitions, as shown in FIG. 16.

Alternatively, an orthogonal sequence with $N^{PHICH}=12$ as shown in Table 14 may be used. That is, sequence index #0 and sequence index #1 that do not include imaginary elements are preset such that sequence index #0 corresponds to NACK and sequence index #1 corresponds to ACK in Table 14, and a modulation symbol sequence can be determined using a sequence selected according to whether a reception acknowledgement response to the TB is ACK or NACK. Here, repetition is not performed because the length of the orthogonal sequence is 12.

A method of generating a modulation symbol sequence for 2 TBs will now be described. The 2 TBs may be transmitted on a PUSCH from a UE. Specifically, the UE may map the 2 TBs to 2 to 4 layers, precode the mapped TBs and then transmit the precoded TBs through a plurality of antennas. Otherwise, the 2 TBs may be respectively transmitted on PUSCHs of 2 UEs each using one TB.

An orthogonal sequence corresponding to a combination of ACK/NACK information for the 2 TBs can be selected using a mapping table such as Table 16 and Table 12.

TABLE 16

| Sequence index | ACK/NACK bits (TB#0, TB#1) |
| --- | --- |
| 0 | (NACK, NACK) |
| 1 | (NACK, ACK) |
| 2 | (ACK, NACK) |
| 3 | (ACK, ACK) |

Figure 17:
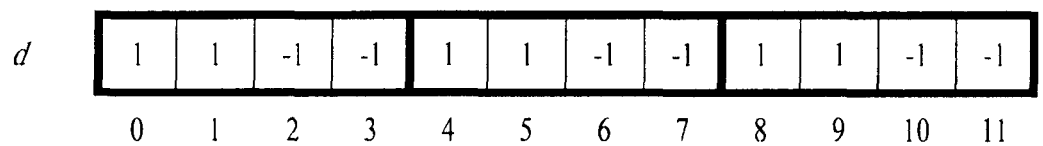

Specifically, when a combination of ACK/NACK for 2 TBs, TB#0 and TB#1 is (ACK, NACK), sequence index #2 is set and orthogonal sequence [1 1 −1 −1] corresponding to sequence index #2 may be selected from Table 12. Since the length of the selected orthogonal sequence is 4, a modulation symbol sequence, as shown in FIG. 17, can be generated through three repetitions corresponding to the number of REs for the ePHICH, 12.

The aforementioned modulation symbol sequence generation method may use a randomly generated scrambling sequence.

Specifically, a length-12 modulation symbol sequence d(i), i=0, ..., $M_{sym}-1$, can be generated by applying a randomly generated scrambling sequence c(i), i=0, ..., $M_{syn}-1$ to a block of complex-valued modulation symbols z(i), i=0, ..., $M_s-1$. This can be represented by the following equation 19.

$$d(i)=f(c(i))\cdot z(i),$$

$$i=0, \ldots, M_{sym}-1, M_s=M_{sym} \quad \text{[Equation 19]}$$

Otherwise, scrambling may be performed using the randomly generated scrambling sequence when an orthogonal sequence is applied to a block of complex-valued modulation symbols without spreading. This can be represented by the following equation 20.

$$d(i)=w(i \bmod N^{PHICH})\cdot f(c(i))\cdot z(i), i=0, \ldots, M_{sym}-1 \quad \text{[Equation 20]}$$

Alternatively, it is possible to spread a block of complex-valued modulation symbols using an orthogonal sequence and apply the randomly generated scrambling sequence thereto. This can be represented by the following equation 21.

$$d(i)=w(i \bmod N^{PHICH})\cdot f(c(i))\cdot z(\lfloor i/N^{PHICH}\rfloor), i=0, \ldots, M_{sym}-1 \quad \text{[Equation 21]}$$

In equations 19 to 21, a length-31 gold sequence may be used as the randomly generated scrambling sequence c(i), i=0, ..., $M_{sym}-1$ and f(·) may be an arbitrary function. Furthermore, the randomly generated scrambling sequence may be a cell-specific or UE-specific sequence. That is, a cell-specific randomly generated scrambling sequence initialized using slot number $n_s$ and cell identifier $N_{ID}^{cell}$. In this case, an initial value is represented by Equation 22.

$$c_{init}=(\lfloor n_s/2\rfloor+1)\cdot(2N_{ID}^{cell}+1)\cdot 2^9+N_{ID}^{cell}$$

For example, in case of $N_{ID}^{cell}=4$ and slot 0, the cell-specific randomly generated scrambling sequence can be initialized with $c_{init}=(2\cdot 4+1)\cdot 2^9+4=4612$ using Equation 22.

Otherwise, a UE-specific randomly generated scrambling sequence initialized using Equation 23 may be used.

$$c_{init}=(\lfloor n_s/2\rfloor+1)\cdot(2N_{ID}^{cell}+1)\cdot 2^{16}+n_{RNTI} \quad \text{[Equation 23]}$$

Here, $n_s$ denotes slot number, $N_{ID}^{cell}$ represents a cell identifier, and $n_{RNTI}$ represents C-RNTI (radio network temporary identifier).

For example, when $N_{ID}^{cell}=4$ and the slot number is 0, a UE having a C-RNTI of 0 can use a randomly generated scrambling sequence initialized with $c_{init}=(2\cdot 4+1)\cdot 2^{16}=589824$ and a UE having a C-RNTI of 1 can use a randomly generated scrambling sequence initialized with $c_{init}=(2\cdot 4+1)\cdot 2^{16}30$ 1=589825 using Equation 23.

When an orthogonal sequence is used to generate a modulation symbol sequence, different orthogonal sequences may be allocated to respective UEs, respective TBs or respective UEs and TBs, as described above.

Different orthogonal sequence indexes may be respectively allocated to ACK/NACK information for PUSCHs and UEs such that a plurality of UEs can simultaneously use the same resource. That is, UE multiplexing can be employed.

For example, when UE #0 uses one TB for PUSCH transmission, sequence index #0 and sequence index #1 may be assigned to UE #0. When UE #1 also uses one TB for PUSCH transmission, sequence index #2 and sequence index #3 may be assigned to UE #1. Each of UE #0 and UE #1 can use 2 sequences allocated thereto to indicate ACK/NACK information for a PUSCH. For example, when PUSCH ACK/NACK information of UE #0 corresponds to NACK, a sequence can be configured using sequence index #0. If the PUSCH ACK/NACK information of UE #0 corresponds to ACK, a sequence can be configured using sequence index #1. When PUSCH ACK/NACK information of UE #1 corresponds to NACK, a sequence can be configured using sequence index #2. If the PUSCH ACK/NACK information of UE #1 corresponds to ACK, a sequence can be configured using sequence index #3.

It is possible to simultaneously transmit ACK/NACK information for a maximum of 2 TBs that can be transmitted by a UE using the same resource by respectively allocating different orthogonal sequence indexes to PUSCH TBs of the UE and PUSCH ACK/NACK information of each TB.

For example, when a PUSCH of UE #0 is transmitted through 2 TBs, if sequence index #0 (in case of NACK) and sequence index #1 (in case of ACK) are allocated to PUSCH TB #0 of UE #0 and sequence index #2 (in case of NACK) and sequence index #3 (in case of ACK) are allocated to PUSCH TB #1 of UE #0, ACK/NACK for PUSCH TB #0 and ACK/NACK for PUSCH TB #1 can be simultaneously transmitted using the same resource.

It is possible to simultaneously transmit ACK/NACK information for TBs transmitting PUSCHs from a plurality of UEs using the same resource by allocating orthogonal sequence indexes depending on the TBs transmitting the PUSCHs of the UEs and ACK/NACK bits of the TBs.

For example, when PUSCHs of UE #0 and UE #1 are transmitted using 2 TBs, sequence index #0 (in case of NACK) and sequence index #1 (in case of ACK) can be allocated to PUSCH TB #0 of UE #0 and sequence index #2 (in case of NACK) and sequence index #3 (in case of ACK) can be allocated to PUSCH TB #1 of UE #0. Similarly, sequence index #4 (in case of NACK) and sequence index #5 (in case of ACK) can be allocated to PUSCH TB #0 of UE #1 and sequence index #6 (in case of NACK) and sequence index #7 (in case of ACK) can be allocated to PUSCH TB #1 of UE #1. Otherwise, sequence indexes #0 to #3 can be allocated to 2 TBs of UE #0 according to ACK/NACK combinations of PUSCH TB #0 and PUSCH TB #1 of UE #0, as shown in Table 16, whereas sequence indexes #4 to #7 can be allocated to 2 TBs of UE #1 according to ACK/NACK combinations of PUSCH TB #0 and PUSCH TB #1 of UE #1.

A sequence generated using the aforementioned method may be multiplexed for UEs.

ACK/NACK for PUSCH TBs of a plurality of UEs can be simultaneously transmitted. For example, a sequence generated from ACK/NACK for the first TB of UE #0 according to the aforementioned method and a sequence generated from ACK/NACK for the first TB of UE #1 according to the aforementioned method can be summed and transmitted.

ACK/NACK for 2 PUSCH TBs of a UE can be simultaneously transmitted. For example, a sequence generated from ACK/NACK for the first TB of UE #0 according to the aforementioned method and a sequence generated from ACK/NACK for the second TB of UE #0 according to the aforementioned method can be summed and transmitted.

ACK/NACK for 2 PUSCH TBs of a plurality of UEs can be simultaneously transmitted. For example, a sequence generated from ACK/NACK for the first TB of UE #0, a sequence generated from ACK/NACK for the second TB of UE #0, a sequence generated from ACK/NACK for the first TB of UE #1, a sequence generated from ACK/NACK for the second TB of UE #1 can be summed and transmitted.

Methods of Mapping a Sequence of ePHICH Modulation Symbols

A description will be given of methods of mapping modulation symbol sequences generated through the aforementioned methods to RBs and/or REs. A modulation symbol sequence mapped to REs may be obtained through mapping to one or more layers and precoding. While the REs to which the modulation symbol sequence is mapped may be located in a control region of a subframe, like a conventional PHICH resource region, the REs are positioned in a PDSCH region, that is, a resource region other than an OFDM symbol region indicated by a PCFICH in the following description. Furthermore, a PHICH group used in LTE/LTE-A systems may be applied.

According to a first embodiment of mapping a modulation symbol sequence to REs, the modulation symbol sequence can be mapped to REs of a PDSCH region other than a PDCCH region in an RB allocated to a UE that will receive an ePHICH. Here, the UE can detect a PHICH corresponding to the entire frequency region of the RB allocated thereto or to part of the frequency region because the UE is aware of the position of the RB allocated thereto. Accordingly, it is not necessary to additionally signal a resource region to the UE.

Figure 18:
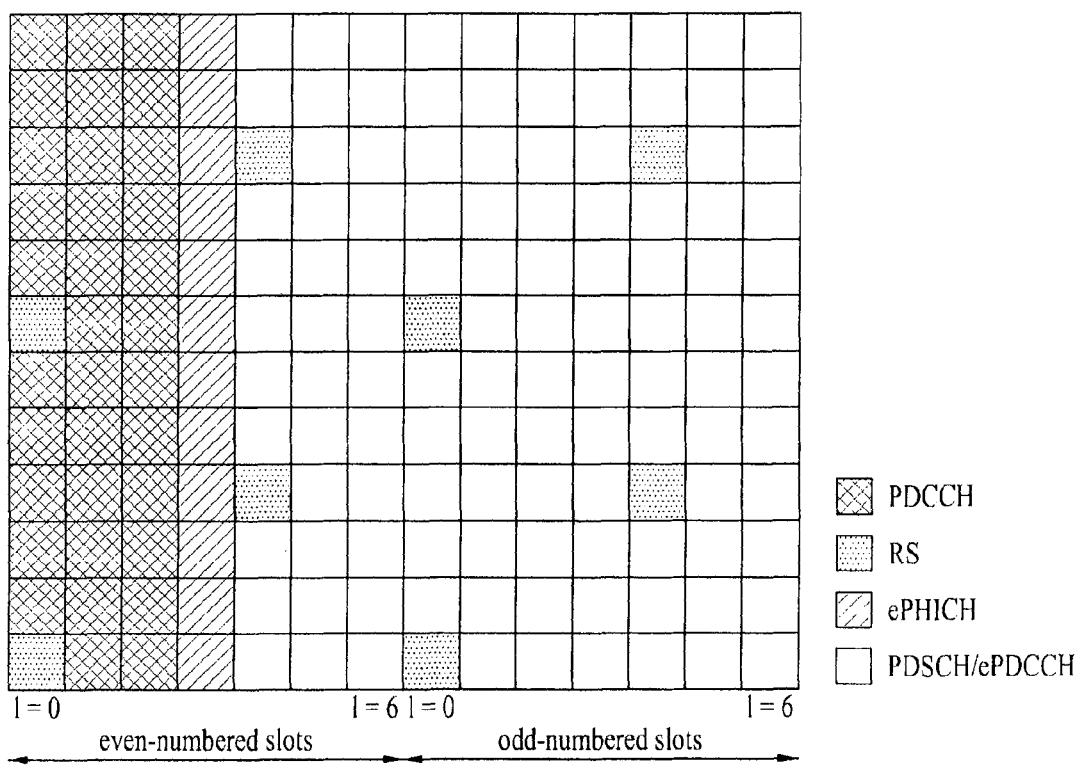
FIG. 18 illustrates mapping of a modulation symbol sequence in an RB allocated to a specific UE.

FIG. 18 illustrates a scheme of mapping a modulation symbol sequence to an RB allocated to a specific UE. Referring to FIG. 18, a modulation symbol sequence generated from ACK/NACK information for one or more TBs transmitted from the specific UE can be mapped to the RB allocated to the specific UE in the direction of frequency axis, as shown in FIG. 18.

According to a second embodiment of mapping a modulation symbol sequence to REs, the modulation symbol sequence can be mapped to a resource region of an RB allocated to a UE other than the UE that will receive the ePHICH or to an RB allocated to a specific UE and an RB allocated to a UE other than the specific UE. This may be performed when multiplexed UEs use the same resource. In this case, the corresponding UE needs to know the positions of REs mapped to the ePHICH in order to detect the ePHICH from an RB other than the RB allocated to the UE. To achieve this, the RE position may be signaled to the UE through higher layer signaling, or a predefined region may be used. If the positions of REs mapped to a modulation symbol sequence are signaled through higher layer signaling, a PDCCH, etc., an OFDM symbol index at which mapping is started can be signaled or the OFDM symbol index and a subcarrier index can be signaled together. Methods of mapping a modulation symbol sequence to an RB according to the second embodiment will now be described with reference to FIGS. 19 to 22.

FIG. 19 is a diagram illustrating a scheme for sequentially mapping symbols of a modulation symbol sequence in the frequency domain. Here, the RB may be an RB allocated to a UE other than the specific UE, as described above.

Referring to FIG. 19(a), it can be seen that the start OFDM symbol index (here, the start OFDM symbol index may be explicitly signaled to the UE or may be blind-detected by the UE using a cell identifier, etc.) is 3 and mapping is performed with a subcarrier index sequentially increasing from 0 when the ePHICH is frequency-preferentially mapped. In this case, it is assumed that a PDCCH uses 3 OFDM symbols.

FIG. 19(b) shows that the start OFDM symbol index is 4 and mapping is performed using the entire band of the RB. Referring to FIG. 19(b), sequential mapping is performed in the frequency domain, starting from OFDM symbol index #4 and subcarrier index #0 and REs to which RSs are mapped are excluded. While 12 symbols of the modulation symbol sequence need to be mapped, symbols of the modulation symbol sequence, which are left without being mapped to the fourth OFDM symbol, may be mapped to the next OFDM symbol, that is, the fifth OFDM symbol since the REs mapped to the RSs are excluded. Here, mapping to the fifth OFDM symbol may be performed starting from subcarrier index #0 as shown in the left part of FIG. 19(b), or performed starting from subframe index #11 as shown in the right part of FIG. 19(b).

FIG. 19(c) illustrates a case in which the start OFDM symbol index is 4 and mapping is performed using the entire bands of 2 RBs in case of frequency-preferential mapping (while 2 RBs are used in this embodiment, two or more RBs can be used and one or more RBs may be located between RBs). In this case, the start OFDM symbol index may be set depending on the cell identifier of the corresponding cell such that the mapped resource region does not considerably interfere with a resource region used for ePHICH transmission in a neighboring cell. For example, an RE region used for mapping, shown in FIG. 19(c), is prevented from being used for mapping in a cell other than the corresponding cell (through nulling, for example) to reduce the influence of interference. The start symbol index can be determined according to cell ID mod 6, for example.

Figure 20:
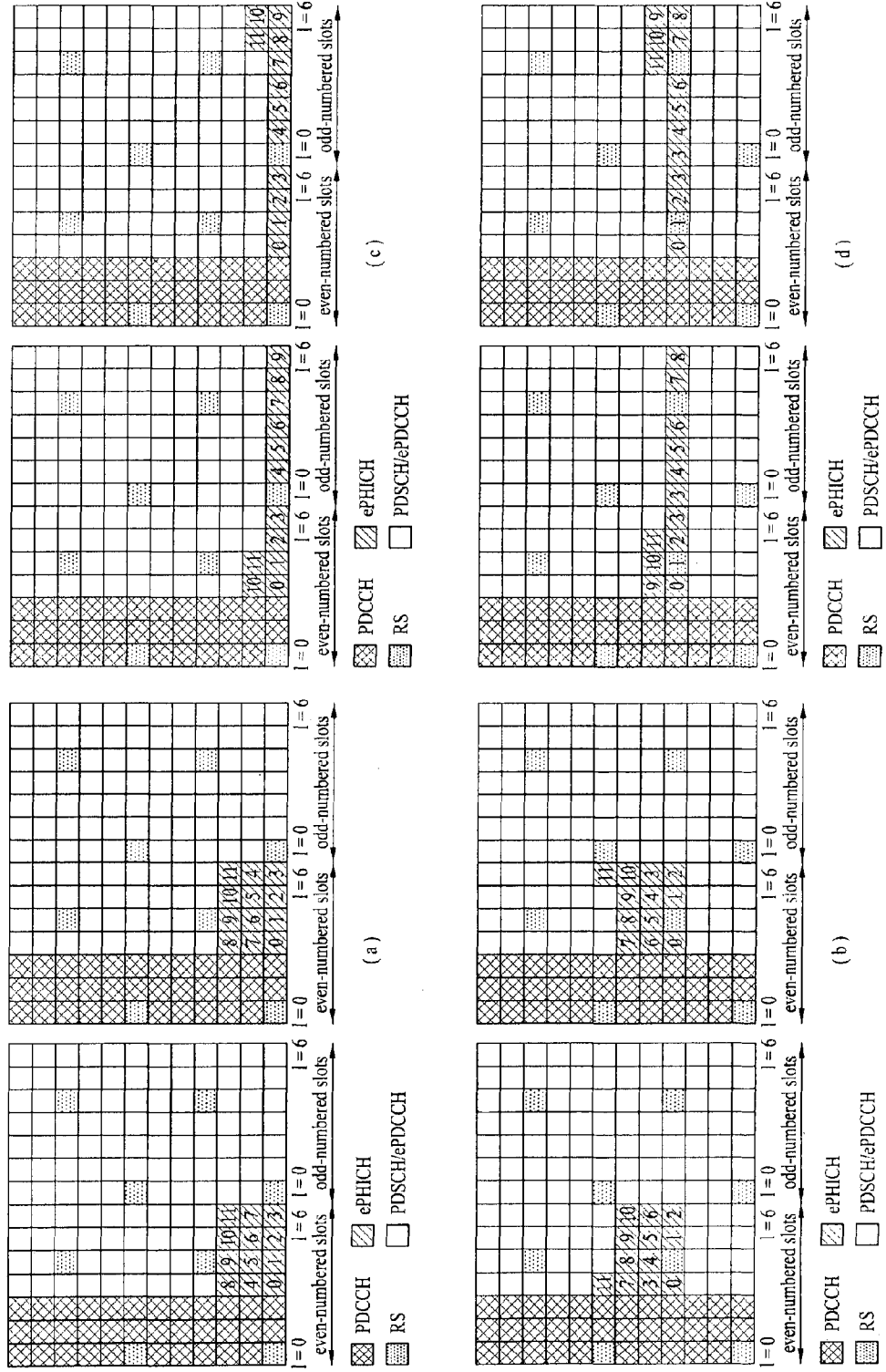

FIG. 20 illustrates schemes of mapping symbols of a modulation symbol sequence to contiguous REs in the time domain.

Referring to FIG. 20(a), when a modulation symbol sequence includes 12 symbols, the symbols are sequentially mapped in the first slot of a subframe in the time domain. Specifically, referring to the left part of FIG. 20(a), the start OFDM symbol index is 3, the start subcarrier index is 0, and mapping is performed for the first slot with the OFDM index increasing in the time domain. Here, if mapping is not completed, the subcarrier index is increased and mapping is carried out.

The right part of FIG. 20(a) shows that the start OFDM symbol index is 4 and the start subcarrier index is 0, similarly to the left part of FIG. 20(a). However, when the subcarrier index is increased, the OFDM symbol index mapped before the subcarrier index is increased is maintained, distinguished from the case shown in the left part of FIG. 20(a).

A mapping method shown in the left and right parts of FIG. 20(b) corresponds to the mapping method shown in FIG. 20(a), except that the start subcarrier index is 3. In this case, REs to which RSs are mapped are excluded from mapping.

FIG. 20(c) shows a scheme for mapping symbols of a modulation symbol sequence with the OFDM symbol index increasing in the time domain for a subframe. In this case, the start OFDM symbol index is 3 and the start subcarrier index is 0. Referring to the left part of FIG. 20(c), the symbols of the modulation symbol sequence are sequentially mapped to one subframe, with the OFDM symbol index sequentially increasing from the OFDM symbol following an OFDM symbol index at which the PDCCH is ended, when the start subcarrier index is 0. Here, when the start subcarrier index is 0, the symbols of the modulation symbol sequence are not completely mapped to 12 REs. Thus, the subcarrier index is increased, and then mapping is performed on OFDM symbols other than OFDM symbols used as a control region, with the OFDM symbol index sequentially increasing. This operation is repeated until all the 12 REs are mapped. Referring to the right part of FIG. 20(c), the ePHICH is mapped to OFDM symbols to occupy one subframe, with the OFDM symbol index sequentially increasing from the OFDM symbol following an OFDM symbol index at which the PDCCH is ended, when the start subcarrier index is 0. Here, when the start subcarrier index is 0, all 12 REs are not mapped. Thus, the subcarrier index is increased, and then mapping is performed with the OFDM symbol index sequentially increasing from OFDM symbol index #6 of the second slot. This operation is repeated until all symbols are mapped.

FIG. 20(d) illustrates a mapping scheme similar to the mapping scheme shown in FIG. 20(c) except that the start subcarrier index is 3. In this case, the start subcarrier index may be set depending on the cell identifier of the corresponding cell such that a resource for mapping does not considerably interferes with a resource used for ePHICH transmission in a neighboring cell. Here, it is possible to alleviate interference with the neighboring cell by transmitting no signal using REs corresponding to the resource for ePHICH transmission in the neighboring cell. Furthermore, a selected RB may be allocated depending on the cell identifier. If the position of the RB is set depending on the cell identifier even when an ePHICH is transmitted in the same region as that used for mapping in the RB, the influence of interference from the ePHICH of the neighboring cell can be reduced. In this case, the RB may be determined according to cell ID mod 6, for example, or higher layer signaling (RRC signaling). At this time, the ePHICH resource region used in the neighboring cell may be nulled. The position of the resource region may be determined according to cell ID mod 6, for example, or higher layer signaling (RRC signalling). In this case, rate matching of a PDSCH or a PDCCH may be needed.

Figure 21:
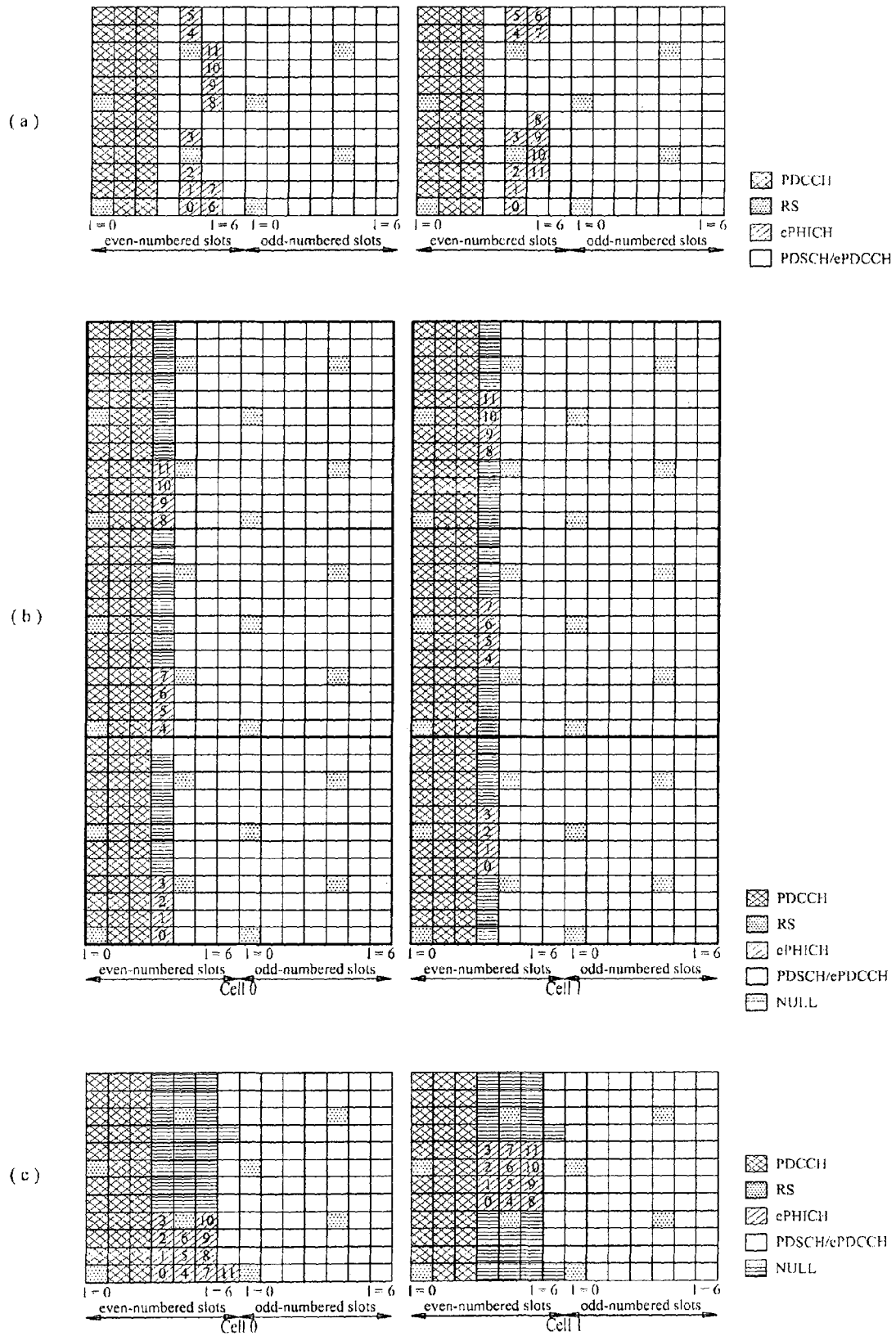
FIGS. 21 and 22 are diagrams illustrating time-domain-first mapping methods according to embodiments of the present invention.

FIG. 21 illustrates methods of frequency-first mapping symbols of a modulation symbol sequence to REs which are discretely contiguous in the frequency domain.

FIG. 21(a) shows a mapping scheme on the basis of a group of 4 contiguous REs when the start OFDM symbol index is 4 and start subcarrier index is 0. Specifically, the left of FIG. 21(a) shows a scheme for mapping modulation symbols with the subcarrier index sequentially increasing when the start OFDM symbol index is 4. When all 12 symbols are not mapped at the OFDM symbol sequence #4, the OFDM symbol index is increased, and then mapping is performed with the subcarrier index increasing from 0 until mapping is completed. The right part of FIG. 21(a) is distinguished from the left part of FIG. 21(a) in that mapping is performed with the subcarrier index decreasing when the OFDM symbol index is increased.

FIG. 21(b) shows a mapping scheme depending on a cell identifier to reduce interference with an ePHICH transmitted in a neighboring cell. In this case, the start subcarrier index may be determined using cell ID mod 6, for example, or higher layer signaling (RRC signaling). While FIG. 21(b) illustrates that symbols are mapped to 3 RBs, one or more RBs may be positioned between neighboring RBs of the 3 RBs because the RBs are allocated to the UE according to distributed resource allocation. Here, the 3 RBs may be assigned depending on the cell identifier of the corresponding cell to reduce interference with the ePHICH from the neighboring cell. In this case, the position of the resource region may be determined by cell ID mod 6, for example, or higher layer signaling (RRC signaling).

Specifically, FIG. 21(b) shows a mapping method for alleviating interference between two cells (cell 0 and cell 1). That is, mapping is performed on a group of 4 contiguous REs in the frequency domain for each RB at start OFDM symbol index #3 and start subcarrier index #0 in cell 0, and mapping is performed on a group of 4 contiguous REs in the frequency domain for each RB at start subcarrier index #4 in cell 1. In this case, interference between cell 0 and cell 1 can be reduced. The start subcarrier index of each cell may be determined using cell ID mod 6, for example, or higher layer signaling (RRC signaling).

FIG. 21(c) illustrates a mapping scheme for reducing intercell interference like the mapping scheme shown in FIG. 21(b). Referring to FIG. 21(c), mapping is performed frequency-preferentially for subcarrier indexes #0 to #3 in cell 0, and mapping is carried out frequency-preferentially for subcarrier indexes #4 to #7 in cell 1.

Figure 22:
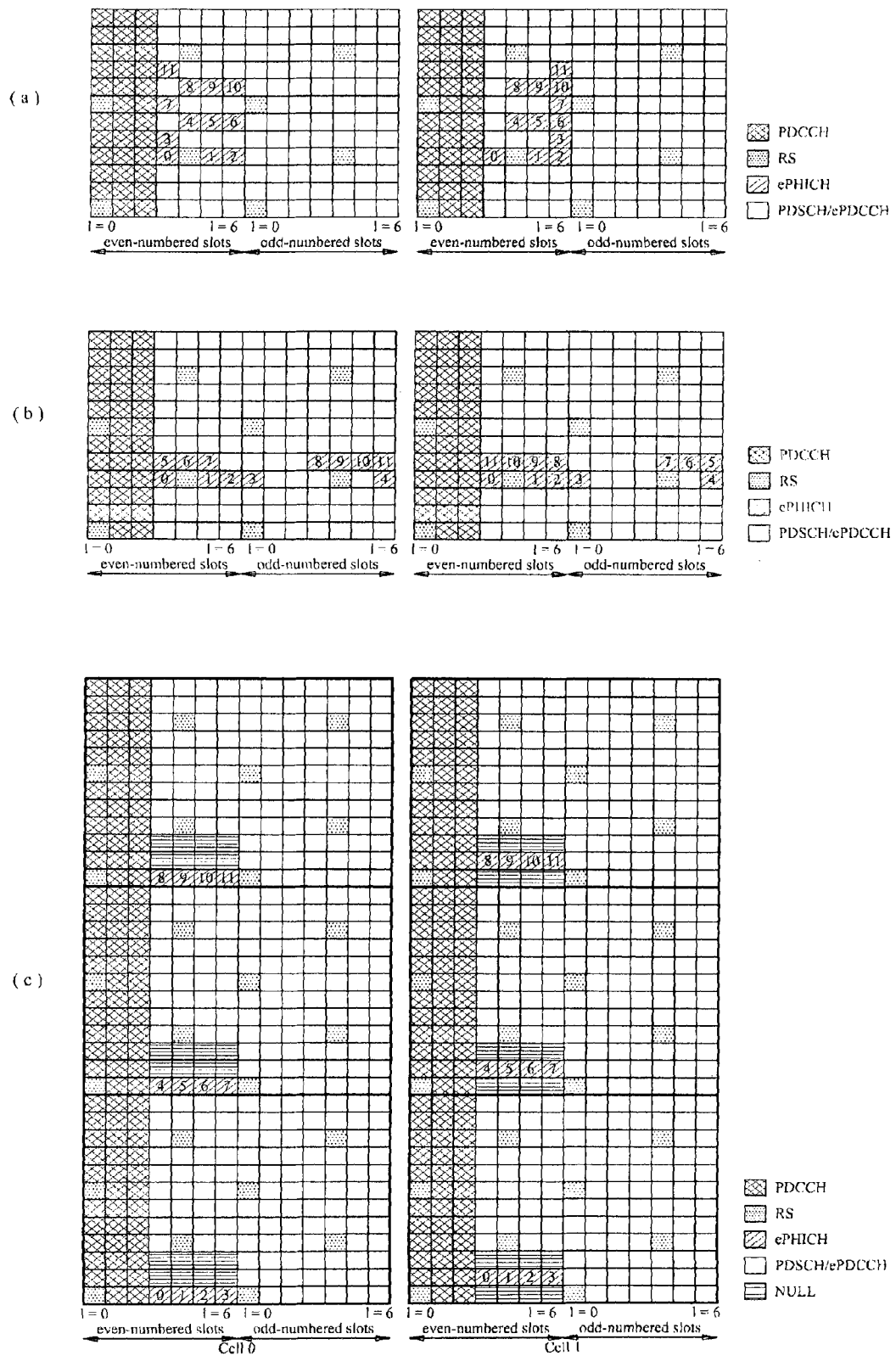

FIG. 22 illustrates methods of mapping symbols of a modulation symbol sequence to discretely contiguous REs time-domain-preferentially.

Referring to FIG. 22(a), mapping is started at OFDM symbol #4 and subcarrier symbol #3 and performed in such a manner that symbols are mapped to 4 contiguous REs in an RE group, the following 4 REs are skipped, and then symbols are mapped to the following 4 contiguous REs in a group. More specifically, the left part of FIG. 22(a) shows that mapping is performed with the OFDM symbol index increasing in the direction of the time domain when the subcarrier index increases whereas the right part of FIG. 22(a) shows that, when the subcarrier index increases, mapping is performed in a direction opposite to the mapping direction corresponding to the previous subcarrier index.

Referring to FIG. 22(b), mapping is performed on the resource region of the second slot in addition to the resource region of the first slot, distinguished from the mapping method shown in FIG. 22(a), which performs mapping on only the resource region of the first slot.

FIG. 22(c) illustrates a mapping scheme depending on a cell identifier to reduce interference with an ePHICH transmitted in a neighboring cell. In this case, the start subcarrier index may be determined according to cell ID mod 6, for example, or higher layer signaling (RRC signaling). While FIG. 22(c) shows that symbols are mapped to 3 RBs, one or more RBs may be positioned between neighboring RBs of the 3 RBs because the RBs are allocated to the UE according to distributed resource allocation. Here, the 3 RBs may be assigned depending on the cell identifier of the corresponding cell to reduce interference with the ePHICH from the neighboring cell. In this case, the position of the resource region may be determined by cell ID mod 6, for example, or higher layer signaling (RRC signaling).

Specifically, FIG. 22(c) shows a mapping method for alleviating interference between two cells (cell 0 and cell 1). That is, mapping is performed on a group of 4 contiguous REs in the time domain for each RB at start OFDM symbol index #3 and start subcarrier index #0 in cell 0, and mapping is performed on a group of 4 contiguous REs in the time domain for each RB at start subcarrier index #4 in cell 1. In this case, interference between cell 0 and cell 1 can be reduced. The start subcarrier index of each cell may be determined using cell ID mod 6, for example, or higher layer signaling (RRC signaling).

According to a third embodiment, a modulation symbol sequence can be mapped to a resource region other than the control region in the system bandwidth. That is, the first and second embodiments perform mapping on some of RBs corresponding to the entire system bandwidth, whereas the third embodiment performs mapping on all RBS included in the entire system bandwidth.

Figure 23:
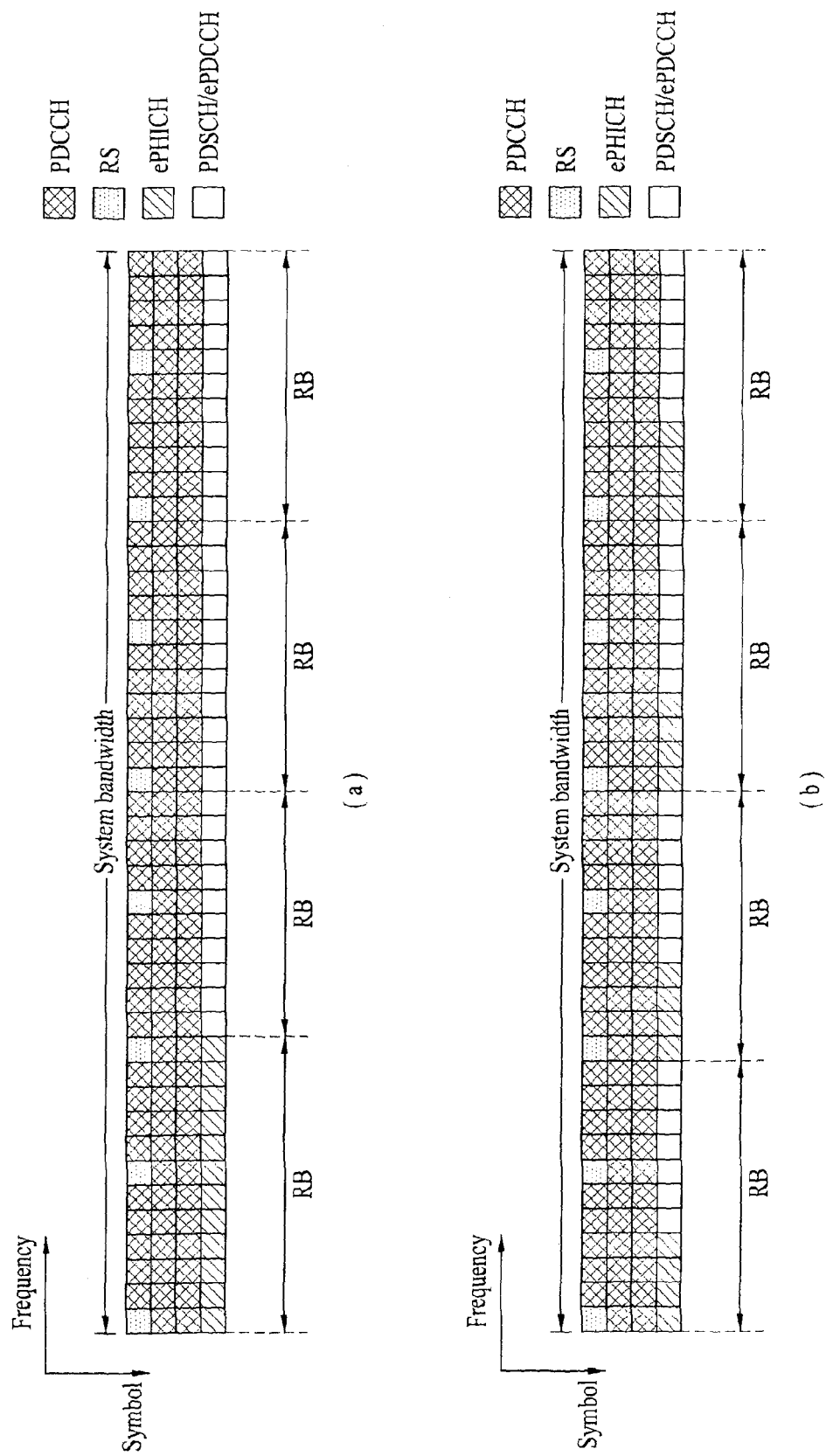
FIG. 23 is a diagram illustrating methods for mapping a sequence to the entire frequency band according to embodiments of the present invention.

FIG. 23(a) illustrates a scheme for mapping a modulation symbol sequence to specific OFDM symbols in the system bandwidth. In FIG. 23(c), the system bandwidth corresponds to 4 RBs. Specifically, mapping is performed at start OFDM symbol index #3 and start subcarrier index #0 in the system bandwidth. In this case, mapping may be performed on a resource region based on the cell identifier in order to reduce interference with a neighboring cell. To prevent mapping from interfering with an ePHICH resource used in the neighboring cell, REs at the same positions as that of the ePHICH region allocated to the neighboring cell may be nulled. Here, rate matching of a PDSCH or a PDCCH may be needed.

Referring to FIG. 23(b), when the start OFDM symbol index is 3 in the system bandwidth, 12 REs for ePHICH transmission are divided into groups each including 4 REs and mapping is performed on each RE group with the subcarrier index increasing from 0. Here, the position of a resource for ePHICH transmission may be determined by the cell identifier or the system bandwidth. In this case, in order to reduce interference from the ePHICH resource allocated in the neighboring cell, a different resource may be assigned on the basis of the cell identifier. To prevent mapping from interfering with the ePHICH resource used in the neighboring cell, REs at the same positions as that of the ePHICH region allocated to the neighboring cell may be nulled. Here, rate matching of a PDSCH or a PDCCH may be needed.

In the mapping methods shown in FIGS. 23(a) and 23(b), the positions of REs may be signaled to the UE through higher layer signaling, or a predefined region may be used. If the positions of REs mapped to the modulation symbol sequence are signaled through higher layer signaling, a PDCCH, etc., an OFDM symbol index at which mapping is started may be signaled, or the OFDM symbol index and a subcarrier index may be signaled together.

In the above-described embodiments, the start OFDM symbol index and/or the start subcarrier index may be determined such that they are closest to an RE carrying a RS. For example, the start OFDM symbol index can be 0 and the start subcarrier index can be 2 in FIG. 21(c). In this case, accuracy of demodulation of an ePHICH can be, improved through more accurate channel estimation.

A modulation symbol sequence mapped to REs according to the above-described methods may be demodulated through coherent detection or non-coherent detection. When a UE uses coherent detection, the UE may perform channel estimation using a CRS, DMRS or the like and demodulate an ePHICH based on the channel estimation result when attempting to detect the ePHICH. This case can correspond to the method for mapping an ePHICH of a specific UE to an RB allocated to the specific UE, from among the aforementioned methods. Accordingly, when the ePHICH is mapped to a region on an RB allocated to a UE other than the specific UE or mapped to the entire system bandwidth, non-coherent detection can be used. Even when the ePHICH is configured by multiplexing ACK/NACK for PUSCHs of a plurality of UEs, a UE can detect the ePHICH from an RB that is not allocated to the UE using non-coherent detection since channel estimation is not needed.

Figure 24:
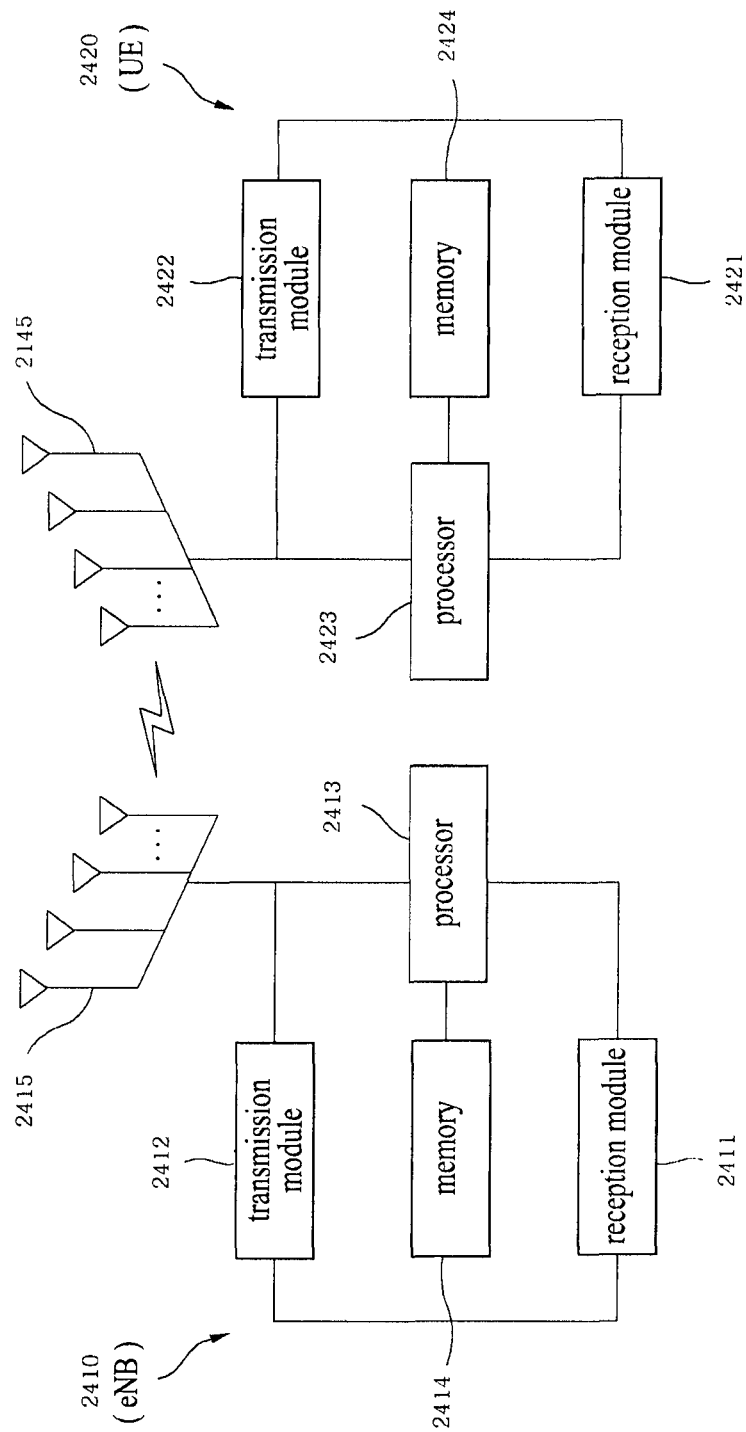
FIG. 24 illustrates configurations of an eNB and a UE according to an embodiment of the present invention.

FIG. 24 illustrates configurations of an eNB and a UE according to an embodiment of the present invention.

Referring to FIG. 24, the eNB 2410 may include a reception module 2411, a transmission module 2412, a processor 2413, a memory 2414, and a plurality of antennas 2415. The plurality of antennas 1815 represents that the eNB 2410 supports MIMO transmission/reception. The reception module 2411 may receive signals, data and information on uplink from the UE. The transmission module 2412 may transmit signals, data and information to the UE on downlink. The processor 2413 may control the overall operation of the eNB 2410.

The processor 2413 of the eNB 2410 precodes a codeword including DCI using one of precoding matrices included in a candidate precoding matrix set of the codebook. The UE may need to attempt to de-precode the precoding matrices included in the candidate precoding matrix set for the DCI.

In addition, the processor 2413 of the eNB 2410 may process information received by the eNB 2410, information to be transmitted to the outside, etc. The memory 2414 may store the processed information for a predetermined time and may be replaced by a component such as a buffer (not shown).

The UE 2420 may include a reception module 2421, a transmission module 2422, a processor 2423, a memory 2424, and a plurality of antennas 2425. The plurality of antennas 2425 represents that the UE 2420 supports MIMO transmission/reception. The reception module 2421 may receive signals, data and information on downlink from the eNB. The transmission module 2422 may transmit signals, data and information on uplink to the eNB. The processor 2423 may control the overall operation of the UE 2420.

The processor 2423 of the UE 2420 may attempt to perform de-precoding using precoding matrices included in the candidate precoding matrix set of the codebook for DCI in a predetermined resource region of a subframe.

The processor 2423 of the UE 2420 may process information received by the UE 2420, information to be transmitted to the outside, etc. The memory 2424 may store the processed information for a predetermined time and may be replaced by a component such as a buffer (not shown).

The detailed configurations of the eNB and the UE may be implemented such that the aforementioned embodiments of the present invention can be independently applied thereto or two or more embodiments can be simultaneously applied thereto, description of redundant parts is omitted for clarity.

Description of the eNB 2410 in FIG. 24 may be equally applied to an apparatus as a downlink transmitter or an uplink receiver and description of the UE 2420 may be equally applied to a relay as a downlink receiver or an uplink transmitter.

The detailed configurations of the eNB and the UE may be implemented such that the aforementioned embodiments of the present invention can be independently applied thereto or two or more embodiments can be simultaneously applied thereto, description of redundant parts is omitted for clarity.

Description of the eNB 1810 in FIG. 24 may be equally applied to an apparatus as a downlink transmitter or an uplink receiver and description of the UE 1820 may be equally applied to a relay as a downlink receiver or an uplink transmitter.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

INDUSTRIAL APPLICABILITY

While the present invention is applied to 3GPP LTE mobile communication system in the above description, the present invention can be used in various mobile communication systems based on the same or equivalent principle.

The invention claimed is:

1. A method for mapping an extended physical hybrid automatic repeat request (ARQ) indicator channel (ePHICH) in a wireless communication system, the method comprising:
    determining one or more resource blocks to which the ePHICH for a user equipment (UE) will be mapped; and
    mapping a plurality of modulation symbols for the ePHICH to a plurality of resource elements included in the resource blocks,
    wherein the resource elements are positioned in regions other than orthogonal frequency division multiplexing (OFDM) symbol regions indicated by a physical control format indicator channel (PCFICH),
    wherein a modulation scheme for the modulation symbols is determined based on whether the resource blocks for the ePHICH include a resource block for another UE other than the UE receiving the ePHICH.

2. The method according to claim 1, wherein the resource blocks are allocated to the UE that receives the ePHICH.

3. The method according to claim 1, wherein the resource blocks include a resource block that is not allocated to the UE receiving the ePHICH.

4. The method according to claim 1, wherein the resource blocks correspond to all resource blocks included in a corresponding frequency band.

5. The method according to claim 1, wherein a start index of the resource elements to which the plurality of modulation symbols are mapped is determined depending on a cell identifier.

6. The method according to claim 1, wherein the mapping of the plurality of modulation symbols comprises sequentially mapping the plurality of modulation symbols to the plurality of resource elements in the frequency domain or in the time domain.

7. The method according to claim 1, wherein the mapping of the plurality of modulation symbols comprises grouping the plurality of modulation symbols into a plurality of groups each including n modulation symbols, and mapping the plurality of groups to the plurality of resource elements in the frequency domain or in the time domain.

8. The method according to claim 7, wherein each of the plurality of groups is mapped with n resource elements intervals in the plurality of resource elements.

9. The method according to claim 1, wherein the mapping of the plurality of modulation symbols comprises mapping the modulation symbols to resource elements adjacent to resource elements mapped to reference signals in the resource blocks.

10. The method according to claim 1, wherein, when the resource blocks are not allocated to the UE receiving the ePHICH, information about at least one of an OFDM symbol or a subcarrier in which mapping of the resource elements is started is transmitted to the UE.

11. The method according to claim 1, wherein the plurality of modulation symbols are generated from reception acknowledgement for one or more transport blocks.

12. The method according to claim 1, wherein the one or more transport blocks are mapped to two or more layers and transmitted on a physical uplink shared channel.

13. The method according to claim 1, wherein the modulation scheme for the modulation symbols is determined based on a type of a reference signal applied to the resource blocks.

14. The method according to claim 13, the modulation scheme comprises a coherent modulation and a non-coherent modulation.

15. An eNB in a wireless communication system, comprising:
   a transmission module; and
   a processor,
   wherein the processor is configured to determine one or more resource blocks to which an extended physical hybrid automatic repeat request (ARQ) indicator channel (ePHICH) for a user equipment (UE) will be mapped and to map a plurality of modulation symbols to a plurality of resource elements included in the resource blocks,
   wherein the resource elements are positioned in regions other than orthogonal frequency division multiplexing (OFDM) symbol regions indicated by a physical control format indicator channel (PCFICH),
   wherein a modulation scheme for the modulation symbols is determined based on whether the resource blocks for the ePHICH include a resource block for another UE other than the UE receiving the ePHICH.

16. The method according to claim 14, wherein the coherent modulation is used for the modulation symbols when the resource blocks for the ePHICH include the resource block for the another UE other than the UE receiving the ePHICH or the reference signal is a cell-specific reference signal.

17. The method according to claim 14, wherein the non-coherent modulation is used for the modulation symbols when the resource blocks for the ePHICH do not include the resource block for the another UE other than the UE receiving the ePHICH and the reference signal is a UE-specific reference signal.

* * * * *